(12) United States Patent
Ricci

(10) Patent No.: US 9,098,367 B2
(45) Date of Patent: Aug. 4, 2015

(54) SELF-CONFIGURING VEHICLE CONSOLE APPLICATION STORE

(71) Applicant: Flextronics AP, LLC, San Jose, CA (US)

(72) Inventor: Christopher P. Ricci, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 28 days.

(21) Appl. No.: 13/963,728

(22) Filed: Aug. 9, 2013

(65) Prior Publication Data

US 2014/0109080 A1 Apr. 17, 2014

Related U.S. Application Data

(60) Provisional application No. 61/714,016, filed on Oct. 15, 2012, provisional application No. 61/715,699, filed on Oct. 18, 2012.

(51) Int. Cl.
*G06F 9/445* (2006.01)
*G06F 3/0486* (2013.01)
*G06F 3/0488* (2013.01)

(52) U.S. Cl.
CPC ............... *G06F 8/61* (2013.01); *G06F 3/0486* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| 4,476,954 | A | * | 10/1984 | Johnson et al. ............... 180/333 |
|---|---|---|---|---|
| 4,875,391 | A | | 10/1989 | Leising et al. |
| 5,847,661 | A | | 12/1998 | Ricci |
| 5,949,345 | A | | 9/1999 | Beckert et al. |
| D429,684 | S | | 8/2000 | Johnson |
| 6,157,321 | A | | 12/2000 | Ricci |
| 6,202,008 | B1 | | 3/2001 | Beckert et al. |
| 6,339,826 | B2 | | 1/2002 | Hayes, Jr. et al. |
| 6,662,077 | B2 | | 12/2003 | Haag |
| 6,690,260 | B1 | | 2/2004 | Ashihara |
| 6,785,531 | B2 | | 8/2004 | Lepley et al. |
| 6,816,783 | B2 | | 11/2004 | Hashima et al. |
| 7,021,691 | B1 | | 4/2006 | Schmidt et al. |

(Continued)

FOREIGN PATENT DOCUMENTS

EP 2192015 6/2010

OTHER PUBLICATIONS

"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.

(Continued)

*Primary Examiner* — Chameli Das
(74) *Attorney, Agent, or Firm* — Sheridan Ross P.C.

(57) ABSTRACT

The present disclosure is directed to an application store on board a vehicle. The application store contains, in one configuration, a plurality of applications for installation on an on board computer of the vehicle, with the applications provided to the vehicle operator being provided to the operator being based on predetermined types of information related to the vehicle, its state, operation, and/or configuration, vehicle location, vehicle type, make, model, and/or year of manufacture, and/or occupant(s) and/or occupant(s) of other vehicles.

30 Claims, 17 Drawing Sheets

(56) References Cited

U.S. PATENT DOCUMENTS

| | | |
|---|---|---|
| 7,187,947 B1 | 3/2007 | White et al. |
| 7,566,083 B2 | 7/2009 | Vitito |
| 7,683,771 B1 | 3/2010 | Loeb |
| 7,738,462 B2 | 6/2010 | Hwang |
| 7,802,832 B2 | 9/2010 | Carnevali |
| 7,881,703 B2 | 2/2011 | Roundtree et al. |
| 7,969,290 B2 | 6/2011 | Wwaeller et al. |
| 8,131,419 B2 | 3/2012 | Ampunan et al. |
| 8,447,598 B2 | 5/2013 | Chutorash et al. |
| 8,527,146 B1 | 9/2013 | Jackson et al. |
| 2001/0010516 A1 | 8/2001 | Roh et al. |
| 2002/0126876 A1 | 9/2002 | Paul et al. |
| 2002/0169551 A1 | 11/2002 | Inoue et al. |
| 2003/0055557 A1 | 3/2003 | Dutta et al. |
| 2004/0039500 A1* | 2/2004 | Amendola et al. .............. 701/29 |
| 2004/0260438 A1 | 12/2004 | Chernetsky et al. |
| 2005/0065678 A1* | 3/2005 | Smith et al. ...................... 701/29 |
| 2005/0085215 A1 | 4/2005 | Kokko et al. |
| 2005/0114864 A1* | 5/2005 | Surace ............................ 719/310 |
| 2005/0144156 A1 | 6/2005 | Barber |
| 2006/0047386 A1 | 3/2006 | Kanevsky et al. |
| 2006/0125631 A1 | 6/2006 | Sharony |
| 2006/0200587 A1 | 9/2006 | Hindman |
| 2006/0288382 A1 | 12/2006 | Vitito |
| 2007/0182816 A1* | 8/2007 | Fox ................................ 348/118 |
| 2007/0194902 A1 | 8/2007 | Blanco et al. |
| 2007/0195997 A1 | 8/2007 | Paul et al. |
| 2007/0213090 A1 | 9/2007 | Holmberg |
| 2008/0051957 A1 | 2/2008 | Breed et al. |
| 2008/0052627 A1 | 2/2008 | Oguchi |
| 2008/0143085 A1 | 6/2008 | Breed et al. |
| 2008/0154957 A1* | 6/2008 | Taylor et al. ................ 707/104.1 |
| 2008/0216067 A1 | 9/2008 | Villing |
| 2009/0168974 A1 | 7/2009 | McCormick |
| 2009/0180668 A1 | 7/2009 | Jones et al. |
| 2009/0189373 A1 | 7/2009 | Schramm et al. |
| 2009/0241883 A1 | 10/2009 | Nagoshi et al. |
| 2009/0247132 A1 | 10/2009 | Sumcad et al. |
| 2009/0278806 A1 | 11/2009 | Duarte et al. |
| 2009/0319181 A1 | 12/2009 | Khosravy et al. |
| 2010/0069115 A1 | 3/2010 | Liu |
| 2010/0076764 A1 | 3/2010 | Chengalvarayan |
| 2010/0082559 A1 | 4/2010 | Sumcad et al. |
| 2010/0118025 A1* | 5/2010 | Smith et al. .................... 345/418 |
| 2010/0121570 A1 | 5/2010 | Tokue et al. |
| 2010/0127847 A1 | 5/2010 | Evans et al. |
| 2010/0167727 A1 | 7/2010 | Madhavan et al. |
| 2010/0167737 A1 | 7/2010 | Madhavan et al. |
| 2010/0256903 A1 | 10/2010 | Johnson |
| 2010/0268426 A1 | 10/2010 | Pathak et al. |
| 2010/0325626 A1* | 12/2010 | Greschler et al. .............. 717/176 |
| 2011/0028138 A1 | 2/2011 | Davies-Moore et al. |
| 2011/0082615 A1 | 4/2011 | Small et al. |
| 2011/0093154 A1* | 4/2011 | Moinzadeh et al. ............ 701/29 |
| 2011/0093846 A1 | 4/2011 | Moinzadeh et al. |
| 2011/0117933 A1 | 5/2011 | Andersson |
| 2011/0175754 A1 | 7/2011 | Karpinsky |
| 2011/0225527 A1 | 9/2011 | Law et al. |
| 2011/0234369 A1 | 9/2011 | Cai et al. |
| 2012/0029852 A1 | 2/2012 | Goff et al. |
| 2012/0065996 A1 | 3/2012 | Daoud et al. |
| 2012/0081267 A1 | 4/2012 | Sirpal et al. |
| 2012/0081311 A1 | 4/2012 | Sirpal et al. |
| 2012/0083971 A1* | 4/2012 | Preston ........................... 701/36 |
| 2012/0092251 A1 | 4/2012 | Hashimoto et al. |
| 2012/0239242 A1 | 9/2012 | Uehara |
| 2012/0252364 A1 | 10/2012 | Inabathuni et al. |
| 2013/0031541 A1* | 1/2013 | Wilks et al. ................... 717/176 |
| 2013/0067599 A1* | 3/2013 | Raje et al. ...................... 726/29 |
| 2013/0099940 A1 | 4/2013 | Protopapas |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Ricci |
| 2013/0158821 A1 | 6/2013 | Ricci |
| 2013/0166097 A1 | 6/2013 | Ricci |
| 2013/0167159 A1 | 6/2013 | Ricci et al. |
| 2013/0231800 A1 | 9/2013 | Ricci |
| 2013/0238165 A1* | 9/2013 | Garrett et al. .................... 701/2 |
| 2013/0241720 A1 | 9/2013 | Ricci et al. |
| 2013/0245882 A1 | 9/2013 | Ricci |
| 2013/0282946 A1 | 10/2013 | Ricci |
| 2014/0245277 A1* | 8/2014 | Petro et al. .................... 717/168 |

OTHER PUBLICATIONS

"Audi A8 MMI Touch," Audi of America, Jan. 7, 2011, [retrieved on Apr. 16, 2014], 2 pages. Retrieved from: www.youtube.com/watch?v=O2nZ-WHo9IA.

Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.

Official Action for U.S. Appl. No. 13/420,236, mailed Apr. 7, 2014 30 pages.

Official Action for U.S. Appl. No. 13/679,412, mailed Jul. 18, 2014 15 pages.

Notice of Allowance for U.S. Appl. No. 13/679,204, mailed Mar. 18, 2014 7 pages.

Official Action for U.S. Appl. No. 13/679,350, mailed May 6, 2014, 14 pages.

Notice of Allowance for U.S. Appl. No. 13/679,350, mailed Jun. 26, 2014 10 pages.

Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].

International Preliminary Report on Patentablity for International (PCT) Patent Application No. PCT/US12/65421, mailed Oct. 17, 2013 33 pages.

Official Action for U.S. Appl. No. 13/462,593, mailed Dec. 19, 2013 18 pages.

Official Action for U.S. Appl. No. 13/420,240, mailed Dec. 17, 2013 14 pages.

Official Action for U.S. Appl. No. 13/679,204, mailed Nov. 14, 2013 20 pages.

Official Action for U.S. Appl. No. 13/679,350, mailed Nov. 13, 2013 12 pages.

Official Action for U.S. Appl. No. 13/679,350, mailed Jan. 22, 2014 13 pages.

Official Action for U.S. Appl. No. 13/679,358, mailed Jan. 27, 2014 18 pages.

U.S. Appl. No. 13/462,593, filed May 2, 2013, Ricci et al.

(56) References Cited

OTHER PUBLICATIONS

U.S. Appl. No. 13/462,596, filed May 2, 2013, Ricci et al.
International Search Report and Written Opinion for International (PCT) Patent Application No. PCT/US12/65421 mailed Feb. 20, 2013, 13 pages.
International Search Report and Written Opinion for International (PCT) Patent Application No. PCT/US12/65470 mailed Mar. 7, 2013, 14 pages.
International Search Report and Written Opinion for International (PCT) Patent Application No. PCT/US12/65474 mailed Feb. 28, 2013, 9 pages.
"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).
Cairnie et al., "Using finger-pointing to operate secondary controls in automobiles," Proceedings of the IEEE Intelligent Vehicles Symposium 2000, Oct. 3-5, 2000, 6 pages.
Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).
Marturano "General Motors Takes a CUE from Customers," InContext, Nov. 8, 2011, 3 pages, found at: (incontextdesign.com/blog/general-motors-takes-a-cue-from-customers/).
"Time-triggered CAN," CIA, © 2001-2013, 4 pages, found at: (www.can-cia.org/index.php?id+166).
Davis et al. "Controller Area Network (CAN) schedulability analysis: Refuted, revisited and revised," Real-Time Systems, Apr. 2007, vol. 35, No. 3, pp. 239-272.
Di Natale "Controller Area Network," Dec. 2009, 54 pages.
Fonseca et al. "Scheduling for a TTCAN network with a stochastic optimization algorithm," Proceedings 8th Internatioanl CAN Conference, Jan. 2002, 7 pages.
Hartwich et al. "CAN Network with Time Triggered Communication," Robert Bosch GmbH Proceedings 7th International CAN Conference, Jul. 2000, 7 pages.
Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.

\* cited by examiner

SELF-CONFIGURING VEHICLE CONSOLE APPLICATION STORE

CROSS REFERENCE TO RELATED APPLICATION

The present application claims the benefits of U.S. Provisional Application Ser. No. 61/714,016, filed on Oct. 15, 2012, entitled "Vehicle Middleware;" and 61/715,699, filed Oct. 18, 2012, entitled "Vehicle Middleware;" each of which is incorporated herein by this reference in its entirety.

Cross reference is made to U.S. patent application Ser. No. 13/679,412, filed Nov. 16, 2012, entitled "Vehicle Application Store for Console"; Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,292, filed Nov. 16, 2012, entitled "Branding of Electrically Propelled Vehicles Via the Generation of Specific Operating Output"; Ser. No. 13/679,400, filed Nov. 16, 2012, entitled "Vehicle Climate Control"; Ser. No. 13/840,240, filed on Mar. 15, 2013, entitled "Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679, 363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

FIELD

The disclosure relates generally to vehicle computer systems and particularly to vehicle computer system interfaces for drivers.

BACKGROUND

Whether using private, commercial, or public transport, the movement of people and/or cargo has become a major industry. In today's interconnected world, daily travel is essential to engaging in commerce. Commuting to and from work can account for a large portion of a traveler's day. As a result, vehicle manufacturers have begun to focus on making this commute, and other journeys, more enjoyable.

Currently, vehicle manufacturers attempt to entice travelers to use a specific conveyance based on any number of features. Most of these features focus on vehicle safety or efficiency but passenger entertainment and productivity features are gaining in popularity. Personal computational devices, such as smart phones, tablet computers, ereaders, and personal digital assistants, are being viewed by potential automobile purchasers as core lifestyle elements to be used at work or home or while driving.

While the automotive industry is offering vehicles accommodating and interfacing with personal computational devices, there remains a need for higher levels of integration of personal computational devices and vehicle private networks and computational systems.

SUMMARY

These and other needs are addressed by the various aspects, embodiments, and/or configurations of the present disclosure. The present disclosure is directed to an application store on board a vehicle.

A microprocessor executable application manager can perform, or cause to be performed, the following steps/operations:

(a) providing a vehicle operator with an application store, the application store comprising information relating to a plurality of applications available for installation on a vehicle computer;

(b) receiving, from the vehicle operator, a request to install at least one of the plurality of applications; and (c) installing the selected at least one of the plurality of applications in an electronic readable memory of the vehicle.

The application manager can perform, or cause to be performed, the following steps/operations:

(a) determine configuration data regarding a vehicle;

(b) determine a requirement of a selected application in an application store, the application store comprising information relating to a plurality of applications available for installation on a vehicle computer; and (d) compare the vehicle configuration data with the requirement of the selected application to determine at least one of whether the selected application can be installed currently in the computer readable medium and/or whether the selected application can be executed currently by on the vehicle computer.

The application manager can configure the application store based on one or more of vehicle state, configuration, and/or operation. Configuring can include one or more of the following:

(i) determining a relative ranking of each of the plurality of applications;

(ii) determining which applications are to be included in the plurality of applications; and (iii) enabling and/or disabling one or more features and/or functions of the application store.

Vehicle state, configuration, and/or operation can be determined based on one or types of sensed information received from one or more vehicle sensors. Examples of sensed information include one or more of the following: wheel state, vehicle speed, acceleration, deceleration, wheel rotation, wheel speed, wheel slip, power source energy output, engine speed, energy input and/or output, turbine speed, input speed, crankshaft position, manifold absolute pressure, mass flow, switch state, a transmission setting, a gear control current setting, a setting of a power controller, a state of a braking system, a seat setting, a weight and/or identity of seated occupant, exterior sound levels, interior sound levels, safety system state, light setting, brake control setting, accelerator pedal setting or angle, clutch pedal setting, emergency brake pedal setting, door setting, engine temperature, passenger compartment or cabin temperature sensor, window setting, imaging output, odometer reading, trip mileage reading, wind speed, radar transmitter/receiver output, brake wear, steering/torque, oxygen level, ambient lighting, ranging sensor output, parking sensor output, heating, venting, and air conditioning (HVAC) sensor output, water sensor output, air-fuel ratio meter output, blind spot monitor output, hall effect sensor output, radio frequency (RF) sensor output, infrared (IR) sensor output, vehicle control system sensor output, wireless network sensor output, vehicle location, vehicle direction of travel, and cellular data sensor output Examples of applications accessible by the application store include applications directed to one or more of the following: vehicle control applications, applications associated with at least one vehicle task, function, and/or operation, applications related to handicap and accessibility graphical user interfaces, email clients, web browsers, communications applications, games, entertainment applications, satellite positioning system receiver applications, automotive navigation applications or devices (which can, for instance, provide pre-set destinations, live traffic information, gas prices along the route, and point-of-interest information, map applications, medical information applications, emergency service applications, noise suppression applications, news-related applications, vehicle manual related applications, weather information-related applications, biometric applications, travel applications, speech recognition applications such as to provide hands-free voice control of other applications, applications to read to the operator Really Simple Syndication ("RSS") feeds, Twitter messages, email messages, and/or instant messages, social networking applications, streaming media applications, and utility applications (e.g., wall paper displayed by console, screen saver displayed by console, configurable parameters, and the like).

The application store configuration can be based on observed behavior of the vehicle operator and/or behaviors of operators of other vehicles.

The application store configuration can be based on one or more of a type, make, model and/or year of manufacture of the vehicle.

The application store configuration can be based on one or more of whether a communication device, separate from the vehicle, is docked or otherwise in signal communication with the application manager and a configuration of and/or applications stored on and executable by the communication device.

The application manager can change, or cause to be changed, license restrictions or permissions to enable one or more of the applications stored on the communication device to execute on a processor on-board the vehicle.

The configuration data can relate to one or more of a current vehicle state, configuration, on board hardware and/or software resource, module, algorithm, and/or component and/or a setting and/or property thereof.

The requirement can relate to one or more of hardware, vehicle local network performance, memory, operating system, software, and vehicle local network algorithm and/or messaging and/or signaling protocol, such as a microprocessor, central processing unit, a service quality measure of network performance, available, unused, unavailable, and/or in use memory capacity, and operating system.

The configuration data can be updated dynamically to reflect a change in the configuration data.

The configuration data can relate to one or more of a currently on board vehicle network accessible hardware and/or software resource, module, algorithm, and/or component and/or a setting and/or property thereof and wherein the requirement relates to one or more of hardware, vehicle local network performance, memory, operating system, software, and vehicle local network algorithm and/or messaging and/or signaling protocol.

The configure operation can include generating and providing to the user a vehicle compatible listing of applications in the application store.

The configure operation can include generating and providing to the user one of a vehicle incompatible listing of applications in the application store and a set of requirements for one or more vehicle incompatible applications to be executable by the vehicle computer.

The present disclosure can provide a number of advantages depending on the particular aspect, embodiment, and/or configuration. The application store can provide an automated interface offering increased vehicle operator convenience, satisfaction flexibility, and versatility. The interface can enable the user to configure the automated console of the vehicle in accordance with his or her needs and desires. It can provide a user with access not only to entertainment applications but also to informational and vehicle maintenance and repair applications that can prove invaluable to vehicle life and operator safety.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "application" refers to application software, also known as an application or an "app", is computer software designed to help the user to perform specific tasks. Examples include satellite location and navigation software, social networking software, gaming software, word processing software, graphics software, and media players. Application software is contrasted with system software and middleware, which manage and integrate a computer's capabilities, but typically do not directly apply in the performance of tasks that benefit the user. The system software serves the application, which in turn serves the user.

The term "application store" refers to a digital application distribution platform that allows users to browse and download applications from an online store. Applications are available either for free or at a cost. Applications can be downloaded directly to a target device.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "automotive navigation system" or "navigation system" is a satellite navigation system designed for use in automobiles. It typically uses a GPS navigation device to acquire position data to locate the user on a road in the unit's map database. Using the road database, the unit can give directions to other locations along roads also in its database. Dead reckoning using distance data from sensors attached to the drivetrain, a gyroscope and an accelerometer can be used for greater reliability, as GPS signal loss and/or multipath can occur due to urban canyons or tunnels.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "computer-readable medium" as used herein refers to any tangible storage and/or transmission medium that participate in providing instructions to a processor for execution. Such a computer-readable medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "dash" and "dashboard" and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The term "desktop" refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The terms "determine", "calculate" and "compute," and variations thereof, as used herein, are used interchangeably and include any type of methodology, process, mathematical operation or technique.

The term "digital distribution" (also called content delivery, online distribution, electronic software distribution (ESD), among others) refers to the delivery of media content such as audio, video, software and video games without the use of physical media usually over online delivery mediums, such as the Internet. The term online distribution is typically applied to freestanding products; downloadable add-ons for other products are more commonly known as downloadable content. An online service for distribution of application software is usually called an "application store" or "app store". Content distributed online may be streamed or downloaded. Streaming involves downloading and using content "on-demand" as it is needed. Meanwhile, downloading content to a hard drive or other form of storage media allows for quick access in the future. Specialist networks known as content delivery networks help distribute digital content over the Internet by ensuring both high availability and high performance. Alternative technologies for content delivery include peer-to-peer file sharing technologies. Content delivery platforms create and syndicate content remotely, acting like hosted content management systems.

The term "display" refers to a portion of a screen used to display the output of a computer to a user.

The term "displayed image" refers to an image produced on the display. A typical displayed image is a window or desktop. The displayed image may occupy all or a portion of the display.

The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

A "multi-screen application" refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

A "single-screen application" refers to an application that is capable of producing one or more windows that may occupy only a single screen at a time.

"Utility software" is system software designed to help analyze, configure, optimize and/or maintain a computer. Utility software usually focuses on how the computer infrastructure (including the computer hardware, operating system, application software and data storage) operates.

The term "vehicle" refers to a device or structure for transporting animate and/or inanimate or tangible objects (e.g., persons and/or things), such as a self-propelled conveyance. The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, aircraft, space craft, flying machines, human-powered conveyances, and the like.

The term "window" refers to a, typically rectangular, displayed image on at least part of a display that contains or provides content different from the rest of the screen. The window may obscure the desktop.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Overview

The present disclosure describes a vehicle having an application store displayed by an on-board console or display providing occupants with plural applications for free or paid download. The application store may be maintained by a cloud-based vendor and/or be pre-stored in vehicle memory at the point of sale. Access to the application store can be gated or triggered based on vehicle state, configuration, and/or operation. Additionally or alternatively, the configuration of the application store can be dependent upon the vehicle state, configuration, and/or operation. Application store configuration, for instance, can refer to the particular applications provided to the user through the application store and the ordering or ranking of the applications in the application store and/or one or more features or functions of the application store. Application store access and/or configuration can further be based on observed user behavior and/or behaviors of other users (e.g., operators of other vehicles).

The Configurable Dash Display

Figure 1:
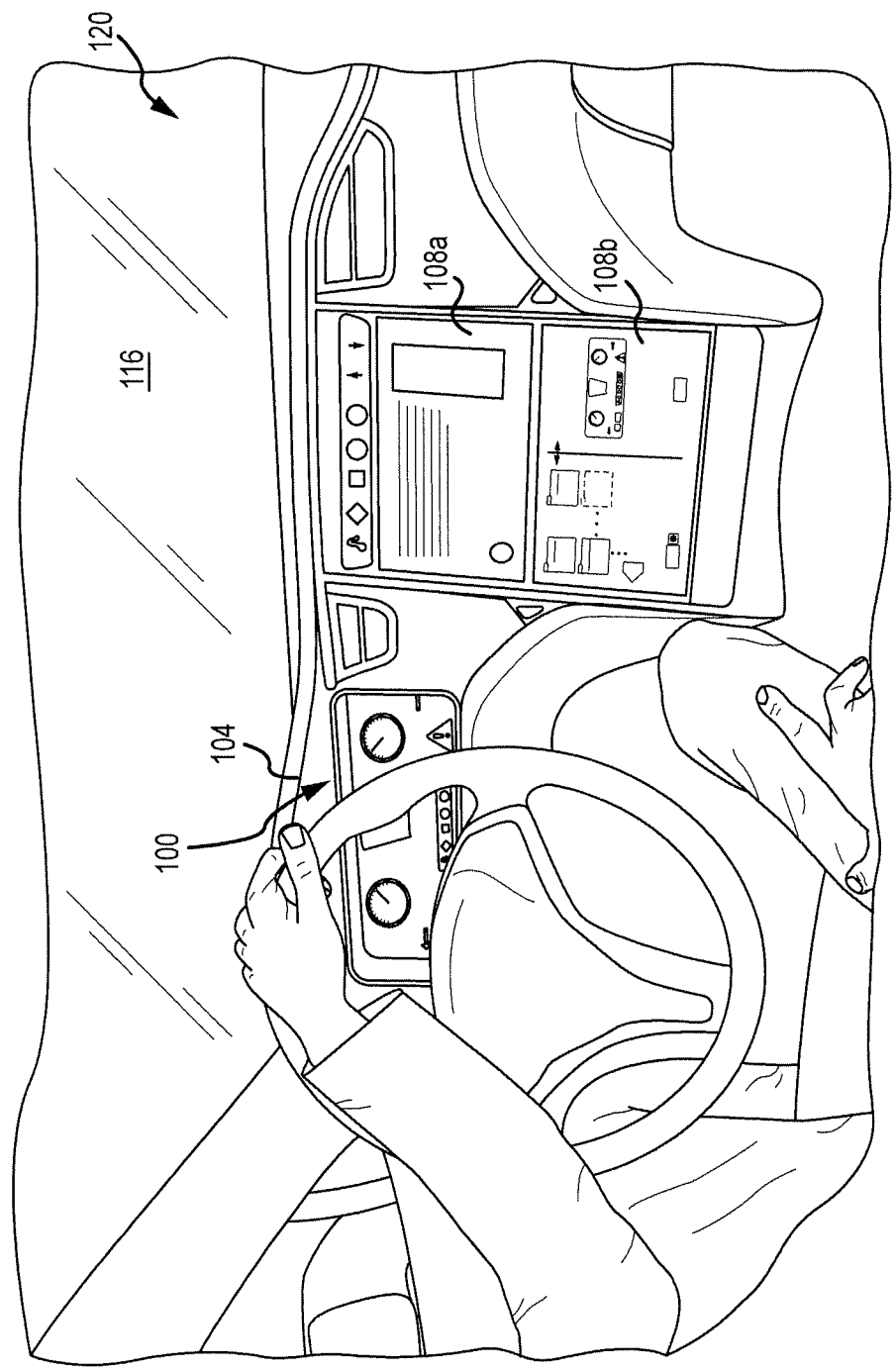
FIG. 1 depicts a first representation of a configurable dash display/cluster in a general viewing area of a vehicle in accordance with an embodiment.

FIG. 1 depicts a representation of a configurable dash display/cluster in a general viewing area of a vehicle 120 in accordance with one embodiment of the present disclosure. In some embodiments, the configurable dash display cluster includes a display device 100 spanning across one or more displays, including one or more console displays 108a, 108b. As depicted, at least one display device 100 may occupy a section of a vehicle dash 104. These one or more display devices may be located on or adjacent to the dash 104 of a vehicle 120 and/or located in rear passenger areas for use or access by passengers. It is an aspect of the present disclosure that the configurable dash display may be located such that one or more individuals associated with a vehicle 120 can interact with and/or observe the configurable dash display. The display device 100 may comprise a front screen, Graphical User Interface, and/or hardware switches or buttons. The display device 100 may be configured and/or receive user input via an associated display, such as through at least one console display 108a, 108b. For example, a user (e.g., a passenger) may wish to configure settings that are associated with the user while the vehicle is being operated by another. In this example, the user could safely arrange and/or configure a dash display for at least one of an operating condition and non-operating condition. The user may then save the configuration and/or arrangement in a memory location that may be associated with at least one user of the vehicle.

Figure 3:
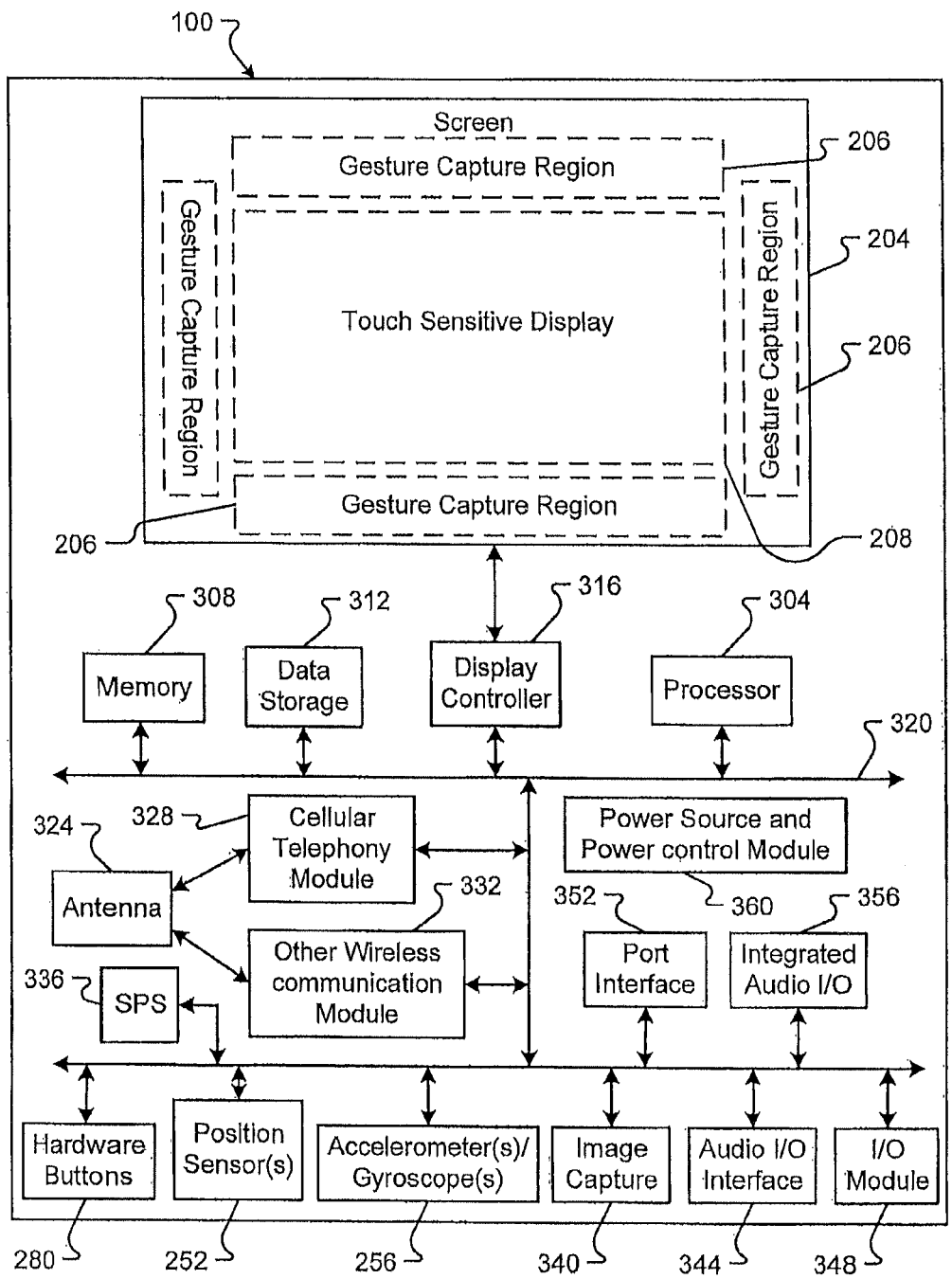
FIG. 3 is a block diagram of hardware according to an embodiment.

With reference to FIG. 3, the display device and its associated console displays 108a, 108b, in one configuration, include a number of devices that work together with at least one process of a vehicle to provide various input/output functions. One such display device 100 includes a touch sensitive front screen 204. In some embodiments, the entire front surface of the front screen 204 may be touch sensitive and capable of receiving input by a user touching the front surface of the front screen 204. The front screen 204 includes touch sensitive display 208, which, in addition to being touch sensitive, also displays information to a user. In other embodiments, the screen 204 may include more than one display area. In other embodiments, not only multi-touch but also one or more of haptic feedback, natural language voice interaction, proximity sensing, and tactile buttons and controls are used to control vehicle tasks, functions, and operations.

In addition to touch sensing, front screen 204 may also include areas that receive input from a user without requiring the user to touch the display area of the screen. For example, the front screen 204 may be configured to display content to the touch sensitive display 208, while at least one other area may be configured to receive touch input via a gesture capture area 206. The front screen 204 includes at least one gesture capture area 206. This at least one gesture capture area 206 is able to receive input by recognizing gestures made by a user touching the gesture capture area surface of the front screen 204. In comparison to the touch sensitive display 208, the gesture capture area 206 is commonly not capable of rendering a displayed image.

There are also a number of hardware components with the display device 100. The display device 100 can include a speaker (not shown) and a microphone (not shown). The microphone may be used by the display device 100 to receive audio input which may control and/or manipulate applications and/or features of display device 100. In embodiments, the display device 100 also includes a camera (not shown) and a light source (not shown), which may be used to control and/or manipulate applications and/or features of the display device 100 in response to detected user input, via gestures and/or facial expressions. The display device 100 can include an electrical and communications connection or docking port (not shown) that is capable of interfacing with one or more other devices, including a (personal, portable, and non-vehicular) communication device of a user. Exemplary communication devices include cellular phones, particularly smart phones, electronic readers, laptops, tablet computers, and the like. The docking port is capable of transferring power from the display device 100 to the other devices. Moreover, input and/or output to the display device 100 and other vehicle components, such as a vehicle control system 224 may be made through the docking port. Communication may involve sending and receiving one or more signals between the communication device and the display device 100. As will be appreciated, the connection from the display device 100 and the at least one other device may be made through the docking port via a physical, inductive, and/or wireless association.

FIG. 3 further illustrates components of a display device 100 in accordance with embodiments of the present disclosure. In general, the device 100 includes the front screen 204 with touch sensitive display 208. The front screen 204 may be disabled and/or enabled by a suitable command. Moreover, the front screen 204 can be touch sensitive and can include different operative areas. For example, a first operative area, within the touch sensitive screen 204, may comprise a touch sensitive display 208. In general, the touch sensitive display 208 may comprise a full color, touch sensitive display. A second area within each touch sensitive screen 204 may comprise a gesture capture region 206. The gesture capture region 206 may comprise one or more area or region that is outside of the touch sensitive display 208 area, and that is capable of receiving input, for example in the form of gestures provided by a user. However, the one or more gesture capture regions 206 do not include pixels that can perform a display function or capability.

It is further anticipated that a third region of the touch sensitive screen 204 may comprise one or more configurable areas. The configurable area is capable of receiving input and has display or limited display capabilities. As can be appreciated, the configurable area may occupy any part of the touch sensitive screen 204 not allocated to a gesture capture region 206 or touch sensitive display 208. In embodiments, the configurable area may present different input options to the user. For example, the configurable area may display buttons or other relatable items. Moreover, the identity of displayed buttons, or whether any buttons are displayed at all within the configurable area of the touch sensitive screen 204 may be determined from the context in which the device 100 is used and/or operated. In an exemplary embodiment, the touch sensitive screen 204 comprises liquid crystal display devices extending across at least the region of the touch sensitive screen 204 that is capable of providing visual output to a user, and a resistive and/or capacitive input matrix over the regions of the touch sensitive screen 204 that are capable of receiving input from the user.

One or more display controllers 316 may be provided for controlling the operation of the touch sensitive screen 204, including input (touch sensing) and output (display) functions. In the exemplary embodiment illustrated in FIG. 3, a touch screen controller 316 is provided for the touch screen 204. In accordance with some embodiments, the functions of a touch screen controller 316 may be incorporated into other components, such as a processor 304.

The processor 304 may comprise a general purpose programmable (micro)processor or controller for executing application programming or instructions. In accordance with at least some embodiments, the processor 304 may include multiple processor cores, and/or implement multiple virtual processors. In accordance with still other embodiments, the processor 304 may include multiple physical processors. As a particular example, the processor 304 may comprise a specially configured application specific integrated circuit (ASIC) or other integrated circuit, a digital signal processor, a controller, a hardwired electronic or logic circuit, a programmable logic device or gate array, a special purpose computer, or the like. The processor 304 generally functions to run programming code or instructions implementing various functions of the device 100.

The display device 100 may also include memory 308 for use in connection with the execution of application programming or instructions by the processor 304, and for the temporary or long term storage of program instructions and/or data. As examples, the memory 308 may comprise RAM, DRAM, SDRAM, or other solid state memory. Alternatively or in addition, data storage 312 may be provided. Like the memory 308, the data storage 312 may comprise a solid state memory device or devices. Alternatively or in addition, the data storage 312 may comprise a hard disk drive or other random access memory.

In support of communications functions or capabilities, the display device 100 can include a cellular telephony module 328. As examples, the cellular telephony module 328 can comprise a GSM, CDMA, FDMA and/or analog cellular telephony transceiver capable of supporting voice, multimedia and/or data transfers over a cellular network. Alternatively or in addition, the display device 100 can include an additional or other wireless communications module 332. As examples, the other wireless communications module 332 can comprise a Wi-Fi, BLUETOOTH™, WiMax, infrared, or other wireless communications link. The cellular telephony module 328 and the other wireless communications module 332 can each be associated with a shared or a dedicated antenna 324.

A port interface 352 may be included. The port interface 352 may include proprietary or universal ports to support the interconnection of the device 100 to other devices or components, such as a dock, which may or may not include additional or different capabilities from those integral to the display device 100. In addition to supporting an exchange of communication signals between the display device 100 and another device or component, the docking port 244 and/or port interface 352 can support the supply of power to or from the display device 100. The port interface 352 also comprises an intelligent element that comprises a docking module for controlling communications or other interactions between the display device 100 and a connected device or component.

An input/output module 348 and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

The I/O module 348 can interface with on-board vehicle components. In modern vehicles, subsystems such as an anti-lock braking system (ABS), engine control unit (ECU), and transmission control unit (TCU) are frequently interconnected using a standardized bus. Standardized buses for use in vehicles include Controller Area Network (CAN), and Local Interconnect Network (LIN) and others, as are known in the art. The I/O module 348, in one configuration, is a network interface with a vehicle network that receives information and/or sends commands to selected on-board vehicle components. The network interface can also comprise other well-known networks such as Ethernet, Wi-Fi, USB, I$^2$C, RS232, RS485 and FireWire. Preferably, the network interface implements a standardized vehicle network.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog to digital converter. Alternatively or in addition, the display device 100 can include an integrated audio input/output device 356 and/or an audio jack for interconnecting an external speaker or microphone. For example, an integrated speaker and an integrated microphone can be provided, to support near talk or speaker phone operations.

Hardware buttons 280 can be included for example for use in connection with certain control operations. Examples include a master power switch, volume control, etc. One or more image capture interfaces/devices 340, such as a camera 272, can be included for capturing still and/or video images. Alternatively or in addition, an image capture interface/device 340 can include a scanner or code reader. An image capture interface/device 340 can include or be associated with additional elements, such as a flash or other light source 276.

The device 100 can also include a satellite positioning system receiver 336 capable of providing absolute location information to other components of the display device 100.

An accelerometer(s)/gyroscope(s) 256 may also be included. For example, in connection with the display of information to a user and/or other functions, a signal from the accelerometer/gyroscope 256 can be used to determine an orientation and/or format in which to display that information to the user. In some embodiments, the accelerometer/gyroscope 256 may comprise at least one accelerometer and at least one gyroscope.

Embodiments of the present invention can also include one or more magnetic sensing features 252. The magnetic sensing feature 252 can be configured to provide a signal indicating the position of the device relative to a vehicle-mounted position. This information can be provided as an input, for example to a user interface application, to determine an operating mode, characteristics of the touch sensitive display 208 and/or other device 100 operations. As examples, a magnetic sensing feature 252 can comprise one or more of Hall-effect sensors, a multiple position switch, an optical switch, a Wheatstone bridge, a potentiometer, or other arrangement capable of providing a signal indicating of multiple relative positions the touch screens are in. Alternatively, the magnetic sensing feature 252 may comprise one or more metallic elements used by other sensors associated with the console and/or vehicle to determine whether the device 100 is in a vehicle-mounted position. These metallic elements may include but are not limited to rare-earth magnets, electromagnets, ferrite and/or ferrite alloys, and/or other material capable of being detected by a range of sensors.

Communications between various components of the display device 100 can be carried by one or more buses 320. In addition, power can be supplied to the components of the display device 100 from a power source and/or power control module 360. The power control module 360 can, for example, include a battery, an AC to DC converter, power control logic, and/or ports for interconnecting the device 100 to an external source of power.

Figure 4:
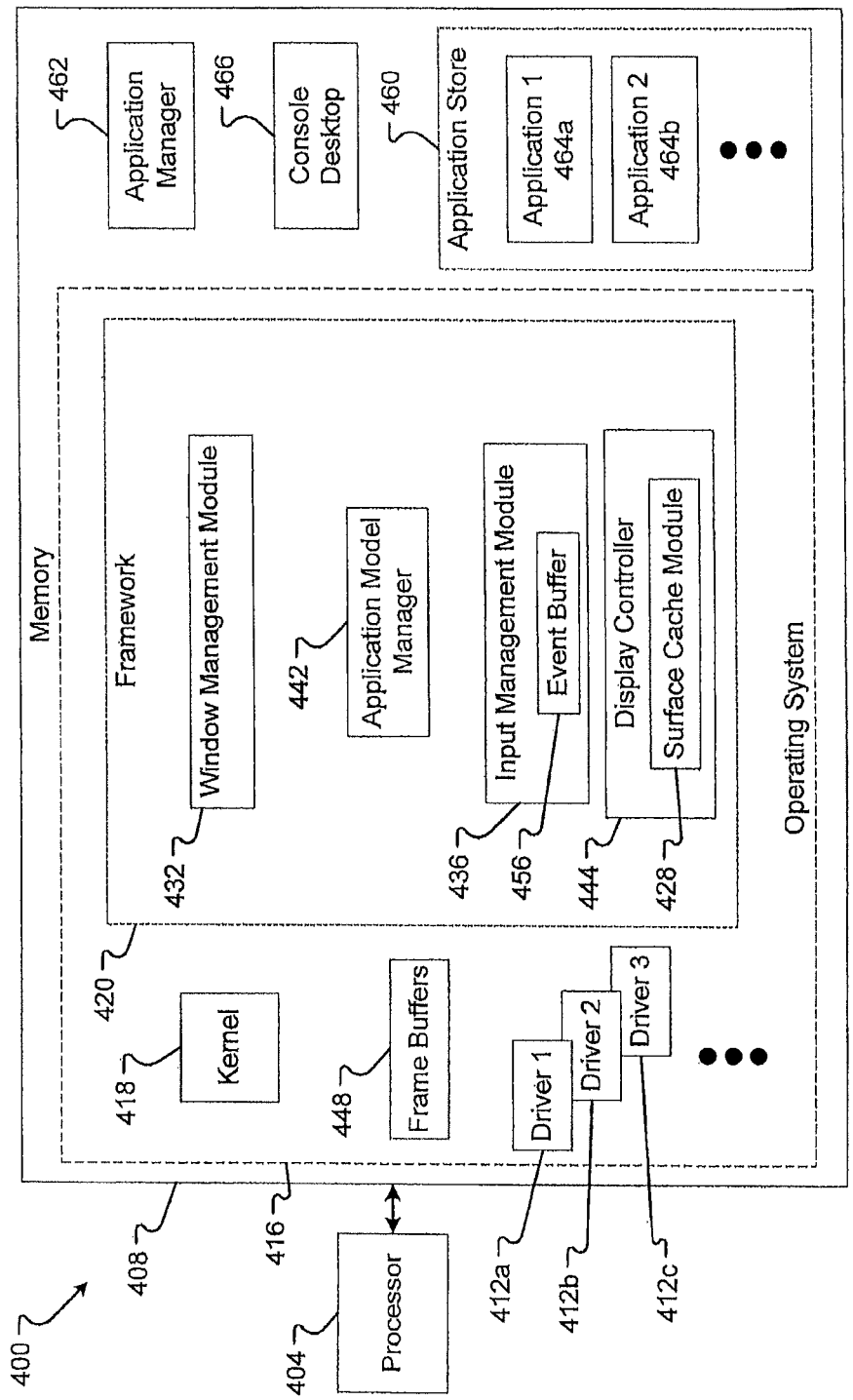
FIG. 4 is a block diagram of an embodiment of software and/or firmware.

FIG. 4 depicts a block diagram of an embodiment of the device software and/or firmware. The memory 408 may store and the processor 404 may execute one or more software components. These components can include at least one operating system (OS) 416, an application manager 462, a console desktop 466, and/or one or more applications 464a, 464b, . . . from an application store 460. The OS 416 can include a framework 420, one or more frame buffers 448, one or more drivers 412a, 412b, 412c, . . . , and/or a kernel 418. The OS 416 can be any software, consisting of programs and data, which manages computer hardware resources and provides common services for the execution of various applications 464. The OS 416 can be any operating system and, at least in some embodiments, dedicated to mobile devices, including, but not limited to, Linux, ANDROID™, iPhone OS (IOS™), WINDOWS PHONE 7™, etc. The OS 416 is operable to provide functionality to the device 100 by executing one or more operations, as described herein.

The framework 420 may be any software or data that allows the multiple tasks running on the device to interact. In embodiments, at least portions of the framework 420 and the discrete components described hereinafter may be considered part of the OS 416 or an application 464. However, these portions will be described as part of the framework 420, but those components are not so limited. The framework 420 can include, but is not limited to, a Surface Cache module 428, a Window Management module 432, an Input Management module 436, an Application Model Manager 442, a Display Controller, one or more frame buffers 448, and/or an event buffer 456.

The Surface Cache module 428 includes any memory or storage and the software associated therewith to store or cache one or more images of applications, windows, and/or console screens. A series of active and/or non-active windows (or other display objects, such as, a desktop display) can be associated with each display. An active window (or other display object) is currently displayed. A non-active window (or other display objects) was opened and, at some time, displayed but are now not displayed. To enhance the user experience, before a window transitions from an active state to an inactive state, a "screen shot" of a last generated image of the window (or other display object) can be stored. The Surface Cache module 428 may be operable to store a bitmap of the last active image of a window (or other display object) not currently displayed. Thus, the Surface Cache module 428 stores the images of non-active windows (or other display objects) in a data store.

In embodiments, the Window Management module 432 is operable to manage the windows (or other display objects) that are active or not active on each of the displays. The Window Management module 432, based on information from the OS 416, or other components, determines when a window (or other display object) is visible or not active. The Window Management module 432 may then put a non-visible window (or other display object) in a "not active state" and, in conjunction with the Task Management module Task Management 440 suspends the application's operation. Further, the Window Management module 432 may assign a display identifier to the window (or other display object) or manage one or more other items of data associated with the window (or other display object). The Window Management module 432 may also provide the stored information to the application 464, or other components interacting with or associated with the window (or other display object). The Window Management module 432 can also associate an input task with a window based on window focus and display coordinates within the motion space.

The Input Management module 436 is operable to manage events that occur with the device. An event is any input into the window environment, for example, a user interface interactions with a user. The Input Management module 436 receives the events and logically stores the events in an event buffer 456. Events can include such user interface interactions as a "down event," which occurs when the screen 204 receives a touch signal from a user, a "move event," which occurs when the screen 204 determines that a user's finger is moving across a screen(s), an "up event, which occurs when the screen 104 determines that the user has stopped touching the screen 204 etc. These events are received, stored, and forwarded to other modules by the Input Management module 436. The Input Management module 436 may also map screen inputs to a motion space which is the culmination of all physical and virtual display available on the device.

The frame buffer 448 is a logical structure(s) used to render the user interface. The frame buffer 448 can be created and destroyed by the OS kernel 418. However, the Display Controller 444 can write the image data, for the visible windows, into the frame buffer 448. A frame buffer 448 can be associated with one screen or multiple screens. The association of a frame buffer 448 with a screen can be controlled dynamically by interaction with the OS kernel 418. A composite display may be created by associating multiple screens with a single frame buffer 448. Graphical data used to render an application's window user interface may then be written to the single frame buffer 448, for the composite display, which is output to the multiple screens 204. The Display Controller 444 can direct an application's user interface to a portion of the frame buffer 448 that is mapped to a particular display 208, thus, displaying the user interface on only one screen 204. The Display Controller 444 can extend the control over user interfaces to multiple applications, controlling the user interfaces for as many displays as are associated with a frame buffer 448 or a portion thereof. This approach compensates for the physical screen 204 and any other console screens that are in use by the software component above the Display Controller 444.

The Application Manager 462 is an application that provides a presentation layer for the window environment, which includes management of the application store. Thus, the Application Manager 462 provides the graphical model for rendering. Likewise, the Desktop 566 provides the presentation layer for the Application Store 460. Thus, the desktop provides a graphical model of a surface having selectable application icons for the Applications 464a, b, . . . in the Application Store 460 that can be provided to the Window Management Module 456 for rendering.

Further, the framework can include an Application Model Manager (AMM) 442. The Application Manager 462 may interface with the AMM 442. In embodiments, the AMM 442 receives state change information from the device 100 regarding the state of applications (which are running or suspended). The AMM 442 can associate bit map images from the Surface Cache Module 428 to the applications that are alive (running or suspended). Further, the AMM 442 may provide a list of executing applications to the Application Manager 462.

The Vehicle Control System

Figure 2:
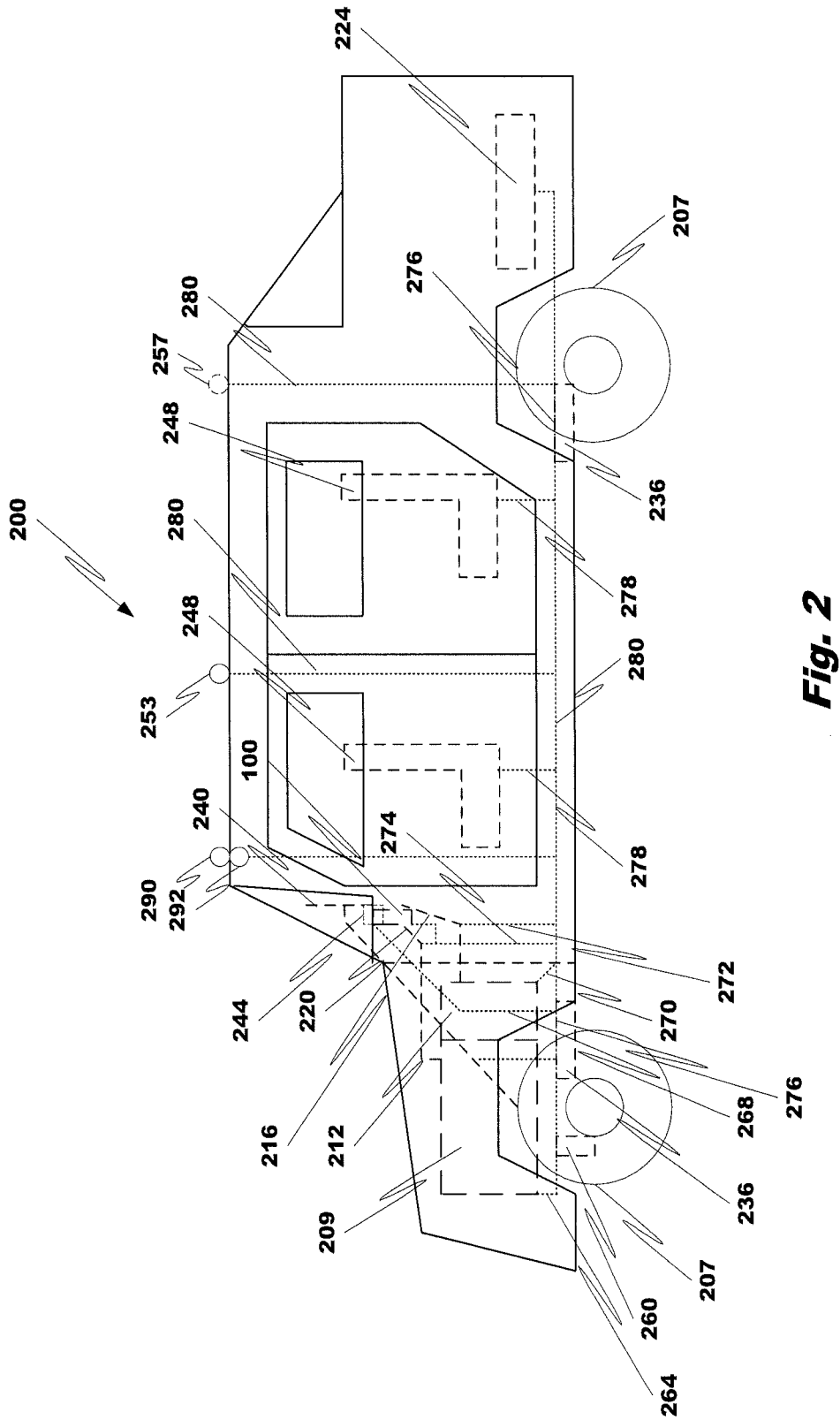
FIG. 2 depicts a vehicle configured in accordance with an embodiment.

FIG. 2 illustrates a vehicle 200 according to an embodiment. The vehicle 200 includes, among many other components common to vehicles, wheels 207, a power source 209 (such as an engine, motor, or energy storage system (e.g., battery or capacitive energy storage system)), a manual or automatic transmission 212, a manual or automatic transmission gear controller 216, a power controller 220 (such as a throttle), a vehicle control system 224, the display device 100, a braking system 236, a steering wheel 240, a power source activation/deactivation switch 244 (e.g., an ignition), an occupant seating system 248, a wireless signal receiver 253 to receive wireless signals from signal sources such as roadside beacons and other electronic roadside devices, and a satellite positioning system receiver 257 (e.g., a Global Positioning System ("GPS") (US), GLONASS (Russia), Galileo positioning system (EU), Compass navigation system (China), and Regional Navigational Satellite System (India) receiver).

The vehicle 200 includes a number of sensors in wireless or wired communication with the vehicle control system 224 and/or display device 100 to collect sensed information regarding the vehicle state, configuration, and/or operation. Exemplary sensors include wheel state sensor 260 to sense one or more of vehicle speed, acceleration, deceleration, wheel rotation, wheel speed (e.g., wheel revolutions-per-minute), wheel slip, and the like, a power source energy output sensor 264 to sense a power output of the power source 209 by measuring one or more of current engine speed (e.g., revolutions-per-minute), energy input and/or output (e.g., voltage, current, fuel consumption, and torque) (e.g., turbine speed sensor, input speed sensor, crankshaft position sensor, manifold absolute pressure sensor, mass flow sensor, and the like), and the like, a switch state sensor 268 to determine a current activation or deactivation state of the power source activation/deactivation switch 244, a transmission setting sensor 270 to determine a current setting of the transmission (e.g., gear selection or setting), a gear controller sensor 272 to determine a current setting of the gear controller 216, a power controller sensor 274 to determine a current setting of the power controller 220, a brake sensor 276 to determine a current state (braking or non-braking) of the braking system 236, a seating system sensor 278 to determine a seat setting and current weight of seated occupant, if any) in a selected seat of the seating system 248, exterior and interior sound receivers 290 and 292 (e.g., a microphone and other type of acoustic-to-electric transducer or sensor) to receive and convert sound waves into an equivalent analog or digital signal. Examples of other sensors (not shown) that may be employed include safety system state sensors to determine a current state of a vehicular safety system (e.g., air bag setting (deployed or undeployed) and/or seat belt setting (engaged or not engaged)), light setting sensor (e.g., current headlight, emergency light, brake light, parking light, fog light, interior or passenger compartment light, and/or tail light state (on or off)), brake control (e.g., pedal) setting sensor, accelerator pedal setting or angle sensor, clutch pedal setting sensor, emergency brake pedal setting sensor, door setting (e.g., open, closed, locked or unlocked) sensor, engine temperature sensor, passenger compartment or cabin temperature sensor, window setting (open or closed) sensor, one or more cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, odometer reading sensor, trip mileage reading sensor, wind speed sensor, radar transmitter/receiver output, brake wear sensor, steering/torque sensor, oxygen sensor, ambient lighting sensor, vision system sensor, ranging sensor, parking sensor, heating, venting, and air conditioning (HVAC) sensor, water sensor, air-fuel ratio meter, blind spot monitor, hall effect sensor, microphone, radio frequency (RF) sensor, infrared (IR) sensor, vehicle control system sensors, wireless network sensor (e.g., Wi-Fi and/or Bluetooth sensor), cellular data sensor, and other sensors known to those of skill in the vehicle art.

In the depicted vehicle embodiment, the various sensors are in communication with the display device 100 and vehicle control system 224 via signal carrier network 280. As noted, the signal carrier network 280 can be a network of signal conductors, a wireless network (e.g., a radio frequency, microwave, or infrared communication system using a communications protocol, such as Wi-Fi), or a combination thereof.

In one implementation, the control system 224 receives and reads sensor signals, such as wheel and engine speed signals, as a digital input comprising a pulse width modulated (PWM) signal. The processor 304 can be configured, for example, to read each of the PWM signals into a port configured as a counter or configured to generate an interrupt on receipt of a pulse, such that the processor 304 can determine, for example, the engine speed in revolutions per minute (RPM) and the speed of the vehicle in miles per hour (MPH). One skilled in the art will recognize that the two signals can be received from existing sensors in a vehicle comprising a tachometer and a speedometer, respectively. Alternatively, the current engine speed and vehicle speed can be received in a communication packet as numeric values from a conventional dashboard subsystem comprising a tachometer and a speedometer. The transmission speed sensor signal can be similarly received as a digital input comprising a PWM signal coupled to a counter or interrupt signal of the processor 304, or received as a value in a communication packet on the network or port interface 352 from an existing subsystem of the vehicle. The ignition sensor signal can be configured as a digital input, wherein a HIGH value represents that the ignition is on and a LOW value represents that the ignition is OFF. Three bits of the port interface 352 can be configured as a digital input to receive the gear shift position signal, representing eight possible gear shift positions. Alternatively, the gear shift position signal can be received in a communication packet as a numeric value on the port interface 352. The throttle position signal can be received as an analog input value, typically in the range 0-5 volts. Alternatively, the throttle position signal can be received in a communication packet as a numeric value on the port interface 352. The output of other sensors can be processed in a similar fashion.

The Application Store

The application store 460 includes plural applications 464a, 464b, . . . The applications 464 can be any higher level software that executes particular console functionality for the user. Applications 464 can include programs such as vehicle control applications (e.g., sensed information display icons (such as in the form of dials, gauges, and the like (e.g., odometer, speedometer, oil pressure, tachometer, battery voltage, tire pressure, gas tank level, engine temperature, indoor/outdoor temperature, trip computers, vehicle/component status reporting, maintenance tire pressure, vehicle/component performance monitoring, and other vehicle-related (sensed) information), applications associated with at least one vehicle function, applications related to handicap and accessibility graphical user interfaces (e.g., larger fonts, controls, text-to-speech and/or speech-to-text interfaces, speech command interfaces, etc.), email clients, web browsers, communications applications (e.g., email applications, texting applications, telephony applications, etc.), games (solo or multi-party games, including games played against other drivers), entertainment applications such as media players (e.g., to enable access to, viewing of, or listening to multimedia files, particularly audio and/or video files), satellite positioning system receiver applications (e.g., for location tracking, fleet tracking, geocoding, geofencing, geotagging, traffic patterns, navigating to a selected destination or other location, and other location-based services), map applications, medical information applications, emergency service applications, noise suppression applications, news-related applications (to provide local, national, and/or international news from a news source), weather information-related applications (to provide local, national, and/or international weather information, such as forecasts, radar images, social networking applications, road conditions, and current weather conditions), biometric applications (e.g., to determine an identity of or authenticate a user, to determine a current medical condition of a user, to determine a current sobriety state of a user, and the like), travel applications (e.g., applications providing the operator with booking or reservation information, traffic information, fuel pricing information, point-of-interest information, and the like), utility applications (e.g., office suites, electronic calendars, electronic clocks, and the like), etc.

The applications 464 can be stored in an application store 460, which may represent any memory or data storage, and the management software associated therewith, for storing the applications 464. Once executed, the applications 464 may be run in a different area of memory 408.

It is anticipated that vehicle applications may be purchased, freely accessed, and/or managed via the Application Store 460. The application store 460 may be similar to an application store for smart phones, mobile devices, and computers. It is anticipated that the present disclosure may use a communications channel or multiple channels available to the vehicle to make an application store purchase and/or download. Moreover, this purchase and download could be effected through the use of at least one individual's phone associated with the vehicle. In some embodiments, the application store may manage one or more applications remotely. This remote management may be achieved on the "cloud," possibly as part of a cloud-based storage medium.

FIGS. 5A-5E depict multiple representations of a graphical user interface ("GUI") in accordance with embodiments of the present disclosure. In some embodiments, icons, applications, and/or the presentation layout may be modified via user input and/or automatically via a processor.

Figure 5A:
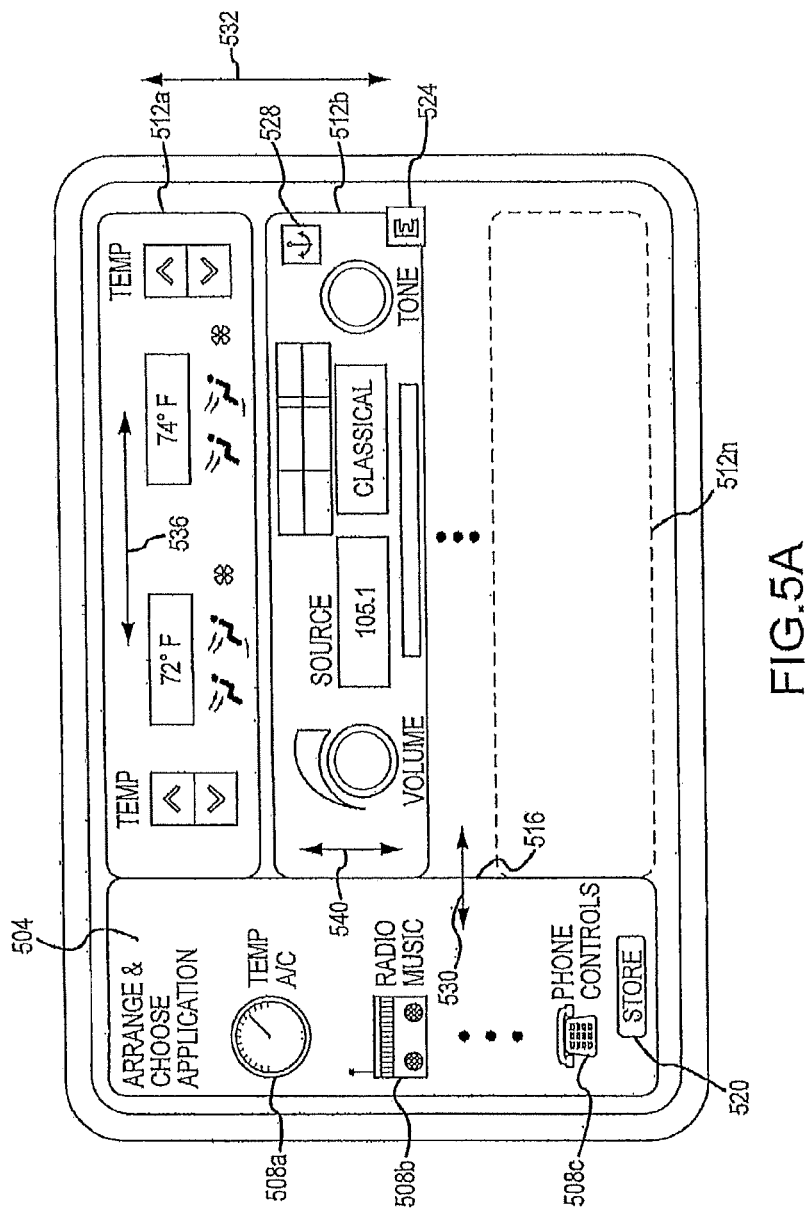
FIG. 5A depicts a first representation of a graphical user interface of a configurable dash display according to an embodiment.

FIG. 5A depicts a first representation of a GUI of a display device 100 in accordance with embodiments of the present disclosure. In embodiments, the display device 100 is adapted to access one or more selected applications, such as through the application store, and run and/or display the applications, such as an application associated with at least one vehicle function. An application may be displayed onto the touch sensitive screen 204. Additionally or alternatively, the display device 100 may run an application that is designed to control the climate functions of a vehicle. In this case, the climate control application 512a may display a desired temperature, various control features, and one or more virtual buttons to manipulate the control of the application. A user, via the touch sensitive screen 204, may increase or decrease the temperature, set different climate modes (such as air recirculation, vent, fan settings, and the like) and set preferences of the application itself. In embodiments, the display device 100 may receive input from a number of different sources, including physical, electrical, and/or audible commands and one or more sensors referenced above. Input may be received at the device 100 through, but not limited to, the touch sensitive screen 204, microphone 232, hardware buttons 280, ports 352, 356, 348, and combinations thereof.

Other vehicle applications and their corresponding functions may be obtained through the application store and run by the display device 100, including entertainment applications (music, movies, etc.), trip computer applications (to display mileage traveled, miles per gallon fuel consumption, average speed, etc.), phone controls (especially hands-free phones associated with the vehicle), GPS, road conditions and warnings, and other applications useful to a vehicle operator or passenger.

It should be noted that the processing resources required for running, or at least displaying, applications on the display device 100 may be split between processors that are associated with the display device 100 and processors that are not associated with the display device 100.

In some embodiments, applications 512a, 512b, 512n may include features that allow for custom and/or predefined functionality. This functionality may be associated with the behavior, appearance, and/or operating capability of one or more applications. For example, an application may include a position anchor icon 528 that, when selected, fixes the application to a location on the display 208. Fixing one or more applications in this manner may allow for the custom positioning of other non-fixed applications around the one or more applications that have been anchored. Moreover, applications and/or icons may be moved and positioned in various locations on the front screen 204. For instance, an application may be resized via control handles 540, 536 which may be present on one or more applications. Applications may be relocated and/or positioned in the presentation layout according to various user input 532.

Additionally or alternatively, applications may be associated with an icon that indicates whether an application is considered essential to vehicle operation. This essential application icon 524, may be selected to designate an application as important to the user and/or vehicle. For example, in the event that an application is configured to display warnings associated with specific states of vehicle operation, the user and/or the device 100 may determine that the application is essential and as such select the essential application icon 524. Selecting the essential application icon 524 may have one or more effects, depending on the specific implementation. It is anticipated that an essential application may be configured to remain displayed on the device 100 or other associated display device if the device 100 is removed from the vehicle-mounted position.

Various features, buttons, icons, controls, and other aspects of applications may be selected by one or more users, or selected by device 100 in response to predetermined conditions. It is an aspect of the present disclosure that these applications may be selected and controlled by device 100, and/or at least one associated peripheral vehicle device.

It is another aspect of the present disclosure that the GUI may include a console application tray 504. The console application tray 504 may be configured to provide access to available console applications 508a, 508b, 508c. In addition, the console application tray 504 may display console applications available from the application store and/or provide a link to an application store via one or more icons 520. Whether applications have been installed, displayed, purchased, or are available for purchase via the application store icon 520, the various status of an application may be indicated in the console application tray 504. For example, if an application is installed and displayed on the display device 100, the application icon in the console application tray 504 may appear differently from other icons that are not installed and displayed. In other words, if the icons are displayed in color to illustrate one or more state, they may appear in black and white, or grayscale, to indicate one or more states. Therefore, given the previous example, available applications may have full color application icons, whereas installed and displayed icons may have grayscale icons. It is anticipated that various states of at least one application icon may be illustrated using various colors, intensities, transparencies, glows, shadows, and the like.

In some embodiments the console application tray 504 may be accessed by dragging a tray handle 516 or other feature to reveal the console application tray 504.

Other embodiments may use gesture recognition features of the touch sensitive display 208, gesture capture region 206, and/or hardware buttons 280 to access the console application tray 504. For instance, the tray 504 may be revealed by a gesture drag on the display 208 using one or more fingers. In addition, the tray 504 may be displayed in response to a predetermined state of the device 100. Revealing the console application tray 504 may be visually represented in a number of ways. Moreover, the effect that revealing the tray may have on displayed applications may also be represented in a number of ways. In some embodiments, the console application tray 504 may fly-out from a side of the display device 100. In other embodiments the console application tray 504 may appear from a location of the display 208. The manner in which the console application tray 504 transitions can be configured with regard to speed, color, transparency, audio output, and combinations thereof. In another embodiment, the console application tray 504 may be "pulled" in a direction 530 from a side of the display device 100 to appear over displayed applications. In yet another embodiment, the console application tray 504 may be pulled from a side of the display device 100 to share the display 208 with any displayed applications 512a, 512b, 512n. This embodiment may require the resizing of displayed applications 512a, 512b, 512n to provide adequate display area for the revealed tray 504. In one embodiment, as the tray 504 increases in size, the displayed applications may decrease in size, and vice versa.

Figure 5B:
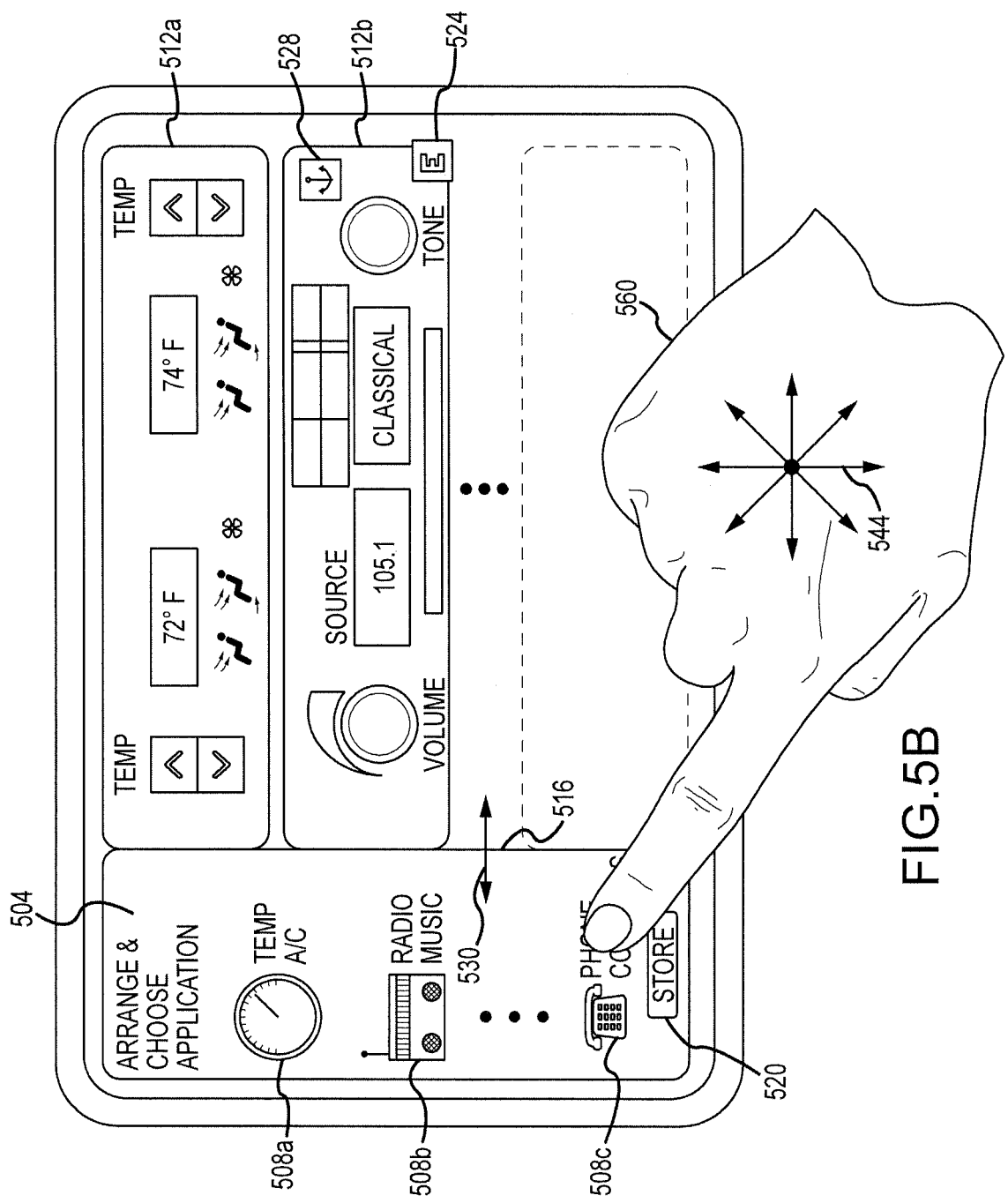
FIG. 5B depicts a second representation of a graphical user interface of a configurable dash display according to an embodiment.

FIG. 5B depicts a second representation of a GUI of a display device 100 in accordance with embodiments of the present disclosure. In embodiments, a user 560 may interface with the GUI and/or the touch-sensitive display 208 to "drag-and-drop" new applications 508a, 508b, 508c, into an application-expanded position on the GUI, where applications 512a, 512b, . . . , 512n are shown in a functional state. Additionally, or alternatively, a user 560 may drag applications 512a, 512b, . . . , 512n from the application-expanded position of the GUI into the application tray 504. It is anticipated that moving an application from the application-expanded position of the GUI to the application tray 504 may hide and/or remove the chosen application from the application-expanded position of the GUI. It is further anticipated that once returned to the application tray 504, the application may be returned to its previous position via user 560 or automatic input. In some embodiments, the applications may be moved and/or positioned on the GUI according to a directional input 544 provided by the user 560. When a user 560 wishes to initiate a directional input 544 and move a given application, the user 560 may initiate such a move by a touch, touch and hold, and/or other input gesture. It is an aspect of the present disclosure that moving an application 512a, 512b, . . . , 512n from the application tray 504 to an application-expanded position on the GUI does not necessarily initiate a function of the application. Application icons may be moved, repositioned, deleted, hidden, and/or otherwise shown by received input. Once the applications are positioned in a desired configuration, any functionality associated with the positioned applications may be accessed via further input.

Figure 5C:
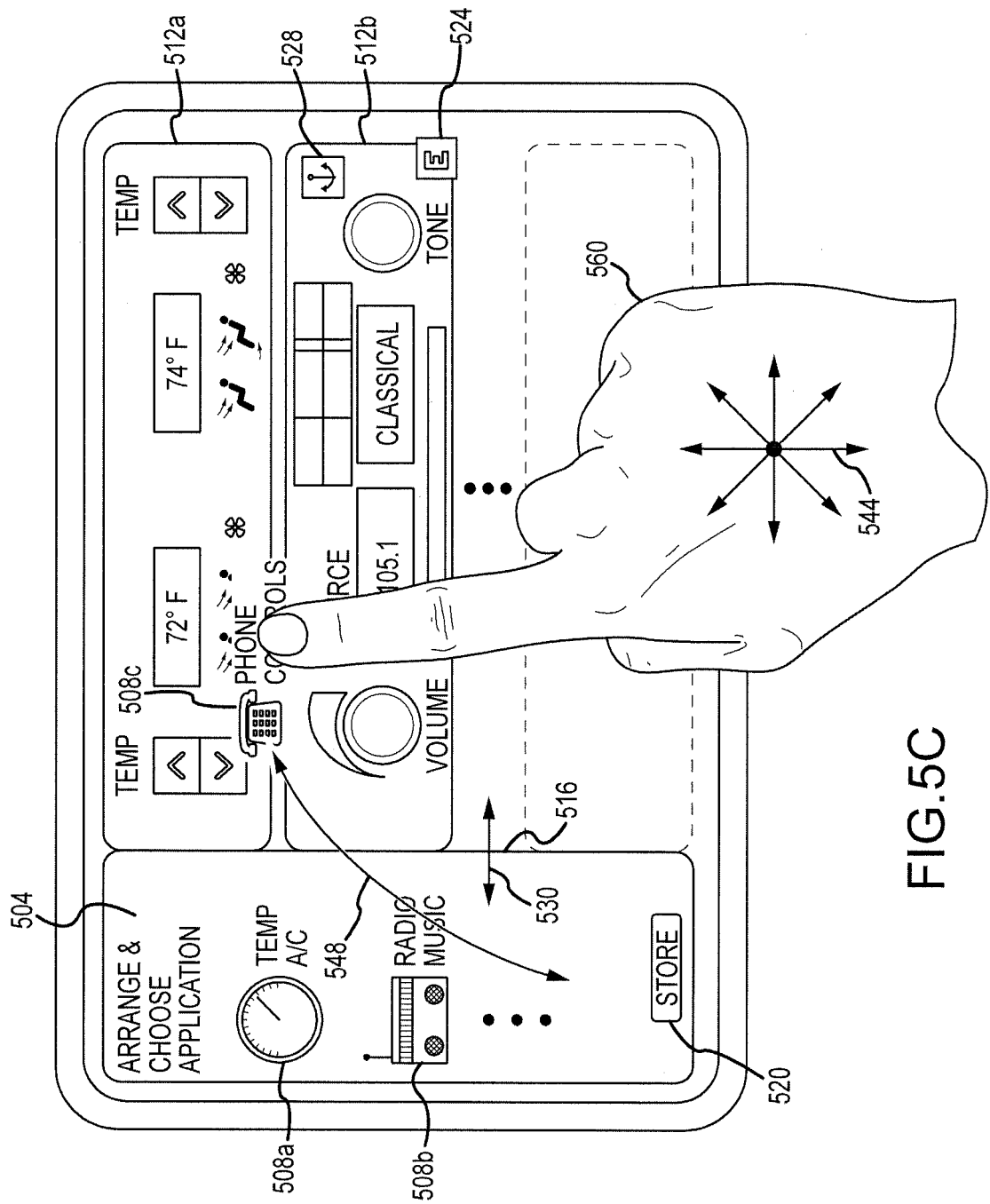
FIG. 5C depicts a third representation of a graphical user interface of a configurable dash display according to an embodiment.

FIG. 5C depicts a third representation of a GUI of a display device 100 in accordance with embodiments of the present disclosure. As described above, a user 560 may position one or more applications 508a, 508b, 508c from the application tray 504 to an application-expanded position via an input gesture. Although, the applications may be automatically moved to and/or from various positions on the GUI via a processor and rules, a user 560 may arrange the applications on the GUI as desired. For example, FIG. 5C shows a user 560 moving an application 508c from the application tray 504 between two applications 512a, 512b that already occupy an application-expanded position of the GUI. The user 560 may drag and/or drop the application to various positions according to directional input 544. For instance, the user 560 has dragged the application 508c along a line 548 to hold between two applications on the GUI 512a, 512b.

Figure 5D:
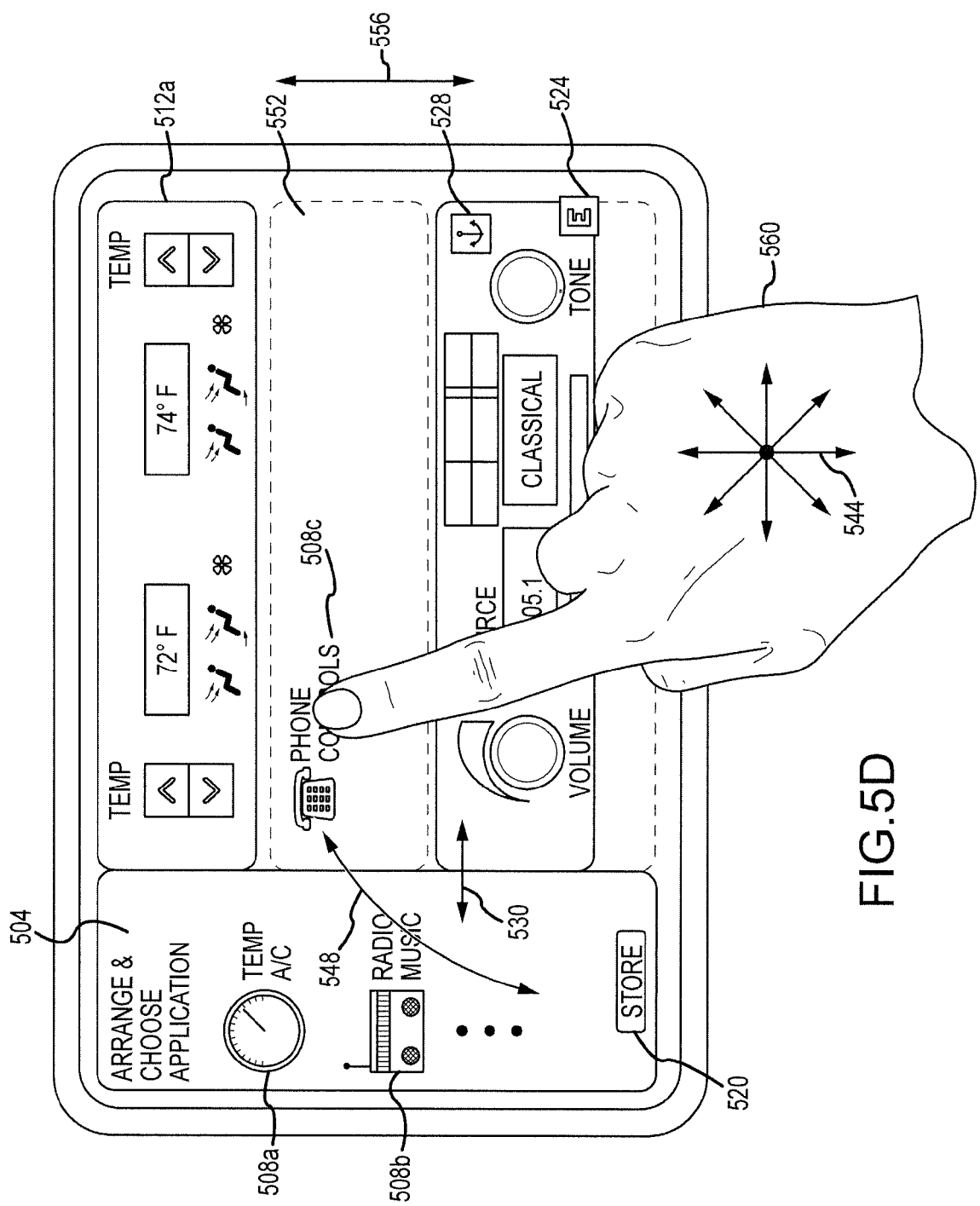
FIG. 5D depicts a fourth representation of a graphical user interface of a configurable dash display according to an embodiment.

FIG. 5D depicts a fourth representation of a GUI of a display device 100 in accordance with embodiments of the present disclosure. Continuing the example described immediately above, the dragged application 508c may be positioned between and/or adjacent to at least one application. Alternatively or additionally, the dragged application 508c may be placed into a position as a first application, where no other applications are shown in the application-expanded position of the GUI. In some embodiments, a dragged application 508*c*, when positioned between or adjacent to other applications in the application-expanded position of the GUI may automatically move and/or resize one or more of the other applications along a directional line 556. Although shown in a linear vertical direction, the directional line along which applications are moved may be linear or non-linear, and may be in any direction vertical, horizontal, angled, and/or combinations thereof. For example, FIG. 5D shows application 512*b* moving below the dragged application 508*c* to accommodate room for the dragged application 508*c* when it is dropped, or placed, and expands into an expanded-state. Once a desired position is found for the dragged application 508*c*, the user 560 may drop the dragged application 508*c* in place.

Figure 5E:
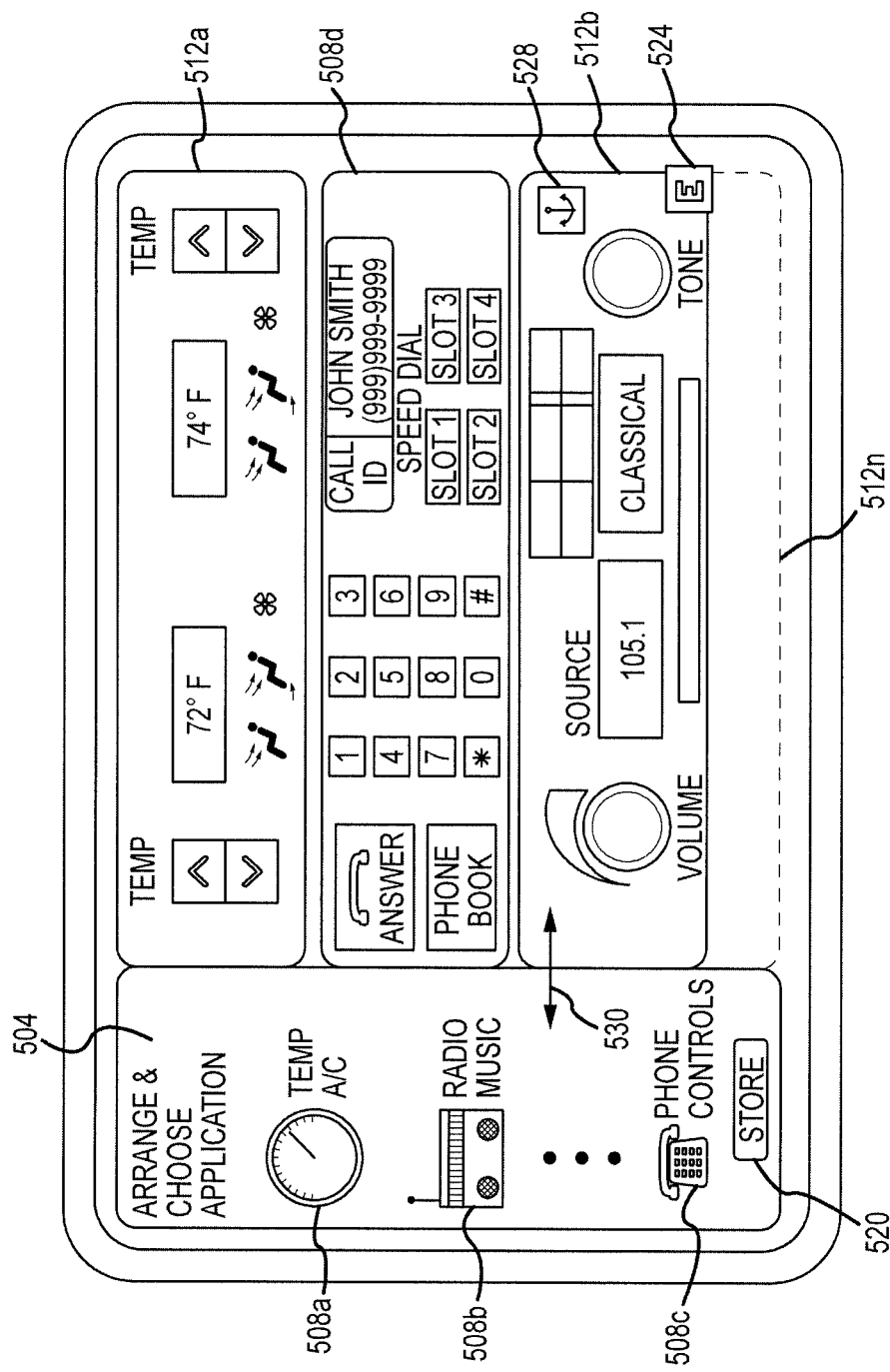
FIG. 5E depicts a fifth representation of a graphical user interface of a configurable dash display according to an embodiment.

FIG. 5E depicts a fifth representation of a GUI of a display device 100 in accordance with embodiments of the present disclosure. As described above, in some embodiments, a dragged application 508*c* may resize, or expand, into a position on an application-expanded position on the GUI. FIG. 5E shows a dragged application 508*c* that has been moved into an application-expanded position along with functional features associated with the expanded application 508*d*. The expanded application 508*d* may be resized and/or repositioned as described above. Different layouts and/or configurations may be found in a common position in a menu structure.

Figure 6A:
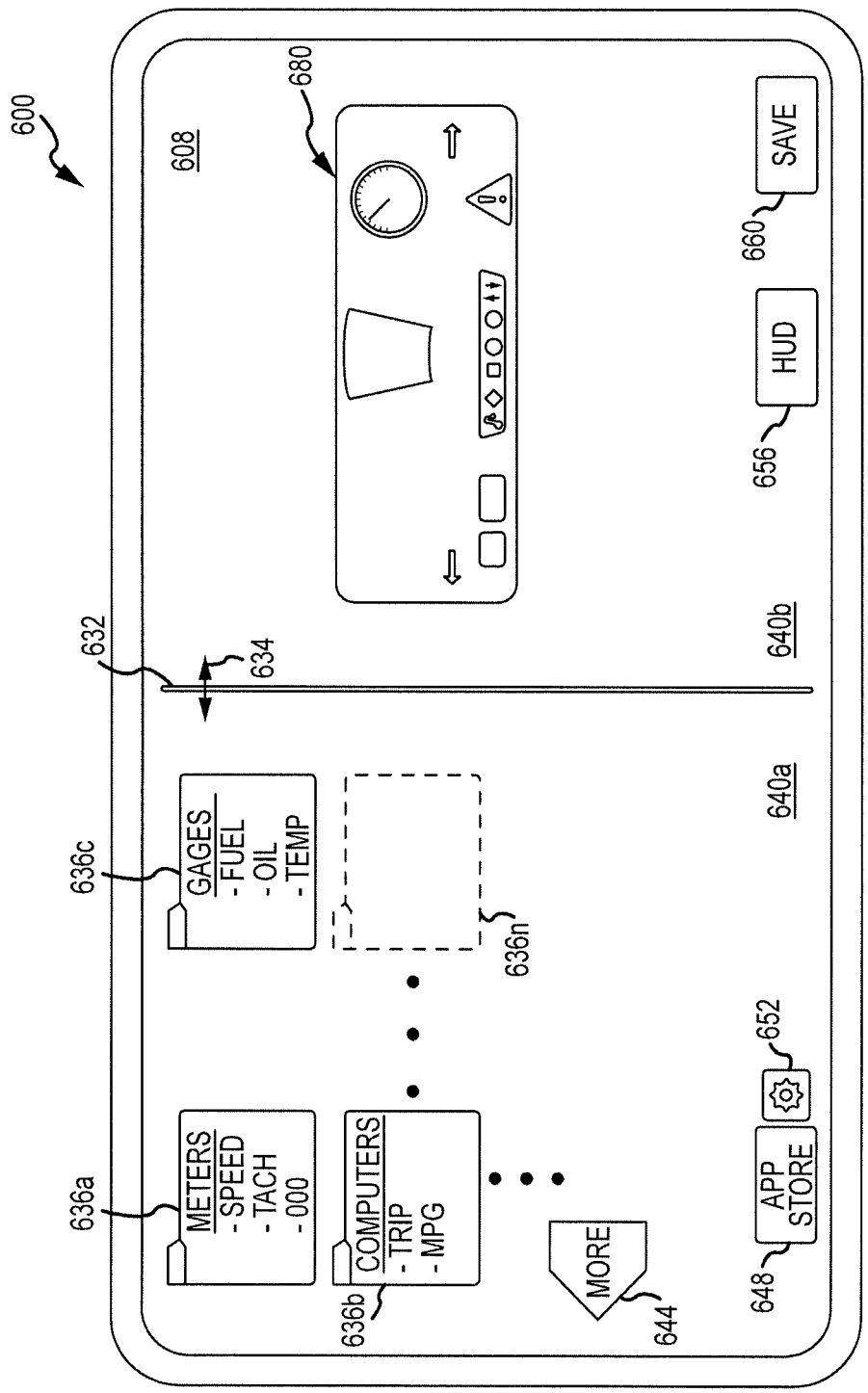
FIG. 6A depicts a sixth representation of a graphical user interface of a configurable dash display according to an embodiment.
Figure 6B:
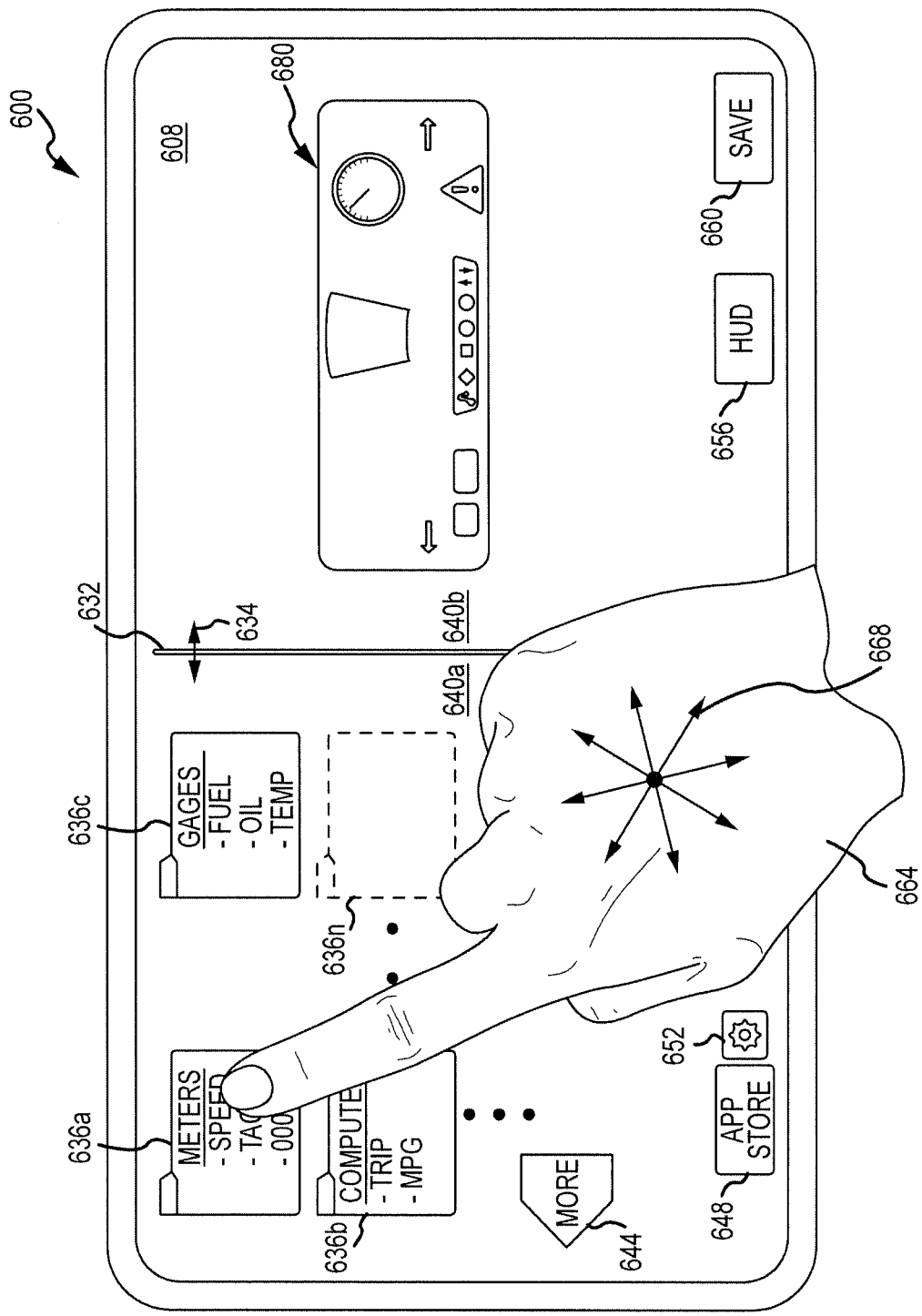
FIG. 6B depicts a seventh representation of a graphical user interface of a configurable dash display according to an embodiment.
Figure 6C:
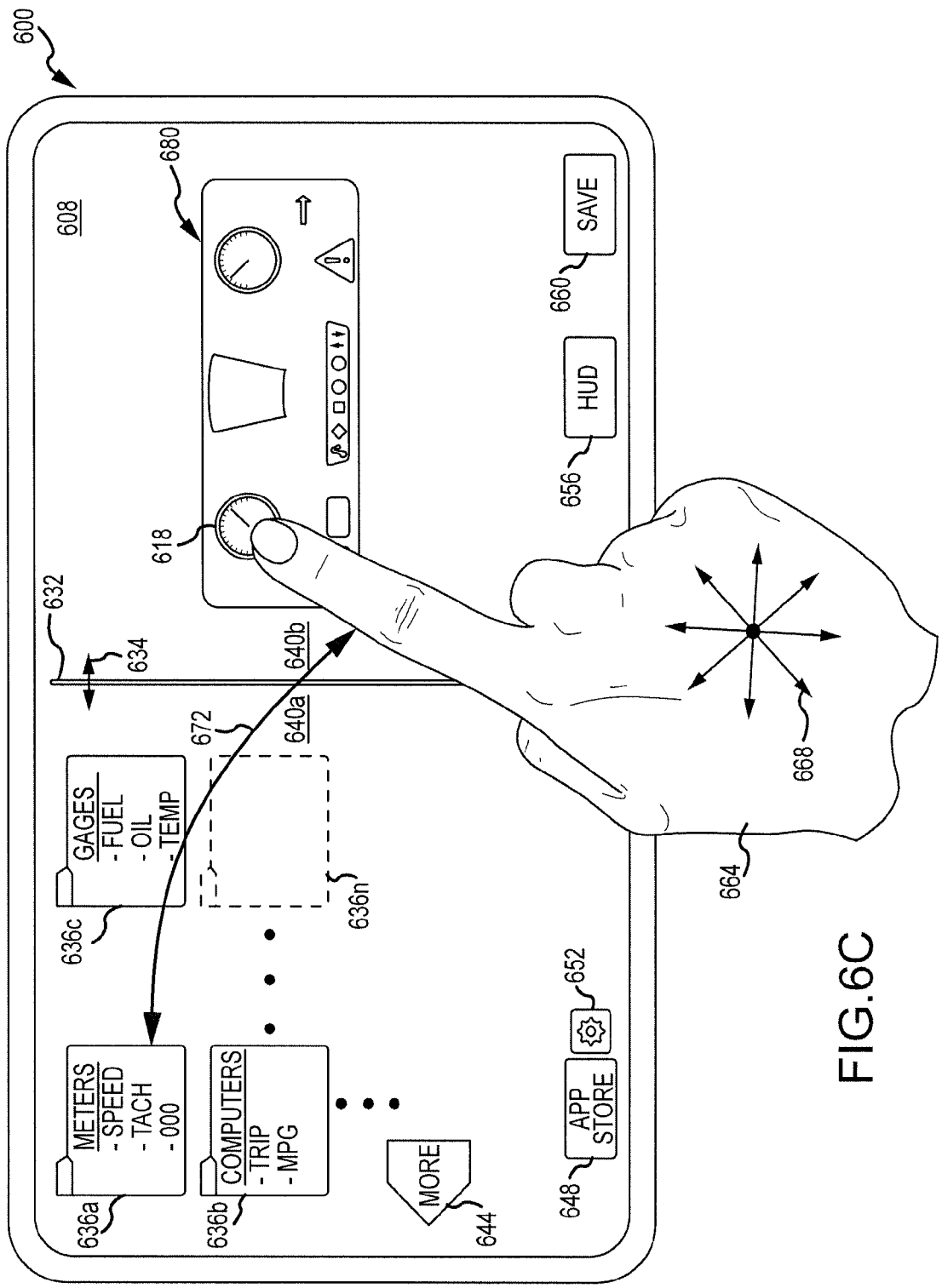
FIG. 6C depicts an eighth representation of a graphical user interface of a configurable dash display according to an embodiment.

FIGS. 6A-6C depict multiple representations of a graphical user interface ("GUI") in accordance with embodiments of the present disclosure. In some embodiments, icons, applications, and/or the presentation layout may be modified via user input and/or automatically via a processor.

As can be appreciated, the description of the display device 100 is made for illustrative purposes only, and the embodiments are not limited to the specific mechanical features shown in FIGS. 6A-6C and described above. In other embodiments, the display device 100 may include additional features, including one or more additional buttons, slots, display areas, and/or shapes. Additionally, in embodiments, the features described above may be located in different parts of the display device 100 and still provide similar functionality. Therefore, FIGS. 6A-6C and the description provided above are non-limiting.

Referring now to FIG. 6A, a first representation of a GUI of a configurable dash display is shown in accordance with one embodiment of the present disclosure. In embodiments, the display device 100 is adapted to run and/or display one or more applications, obtained through the application store, that are associated with at least one vehicle function. An application may be displayed onto the touch sensitive screen 204. Additionally or alternatively, the display device 100 may run at least one application that is designed to monitor and/or control one or more functions of a vehicle. In some embodiments, a user may add applications via an application tray that may be accessed by dragging a tray handle 632 from a side of the display device 100. In some embodiments, the display device 100 may receive input from a number of different sources, including physical, electrical, and/or audible commands. Input may be received at the display device 100 through, but not limited to, the touch sensitive screen 204, a microphone, hardware buttons, ports, cameras, and combinations thereof.

Other vehicle applications and their corresponding functions may be obtained through the application store and run by the display device 100, including entertainment applications (music, movies, etc.), trip computer applications (to display mileage traveled, miles per gallon fuel consumption, average speed, etc.), phone controls (especially hands-free phones associated with the vehicle and/or with a passenger (such as a smart phone, tablet computer, laptop computer, ereader, etc.), GPS, road conditions and warnings, and other applications useful to a vehicle operator or passenger. It is anticipated that any of applications referenced herein may be purchased and/or managed via the Application Store 648.

It is another aspect of the present disclosure that the GUI may include an application tray 640*a*. The application tray 640*a* may be configured to provide access to available dash display applications 636*a*, 636*b*, 636*c*. In addition, the application tray area 240 may display dash display applications available from the application store and/or provide a link to the application store via one or more icons 648. Whether applications have been installed, displayed, purchased, or are available for purchase via the application store icon 648, the various status of an application may be indicated in the application tray area 640*a*. For example, if an application is installed and displayed on the device 100, the application icon in the application tray 640*a* may appear differently from other icons that are not installed and displayed. In other words, if the icons are displayed in color to illustrate one or more state, they may appear in black and white, or grayscale, to indicate one or more other states. Therefore, given the previous example, available applications may have full color application icons, whereas installed and displayed icons may have grayscale icons. It is anticipated that various states of at least one application icon may be illustrated using various colors, intensities, transparencies, glows, shadows, and the like.

In some embodiments, the GUI display 608 is separated into different areas. As shown, the display device 100 display 608 has been separated into two different areas represented as a tray area 640*a* and a configuration area 640*b*. In embodiments, the tray area 640*a* may be revealed by dragging a tray handle 632 in a direction 634 away from a side of the display device 100 display 608. Although shown as being accessed from the left side of the display device 100 display 608, it should be appreciated that the tray handle 632 and corresponding tray area 640*a* may be accessed from any area and/or side of the display device 100 display 608. The tray handle 632 may be dragged via input received by the display device at one or more gesture capture area 206. Furthermore, the GUI may be separated into one or more different areas.

In some embodiments the application tray area 640*a* may be accessed by dragging a tray handle 632 or other feature to reveal the application tray area 640*a*. Other embodiments may use gesture recognition features of the touch sensitive display 608, gesture capture region 606, and/or associated hardware buttons to access the application tray area 640*a*. For instance, the tray area 640*a* may be revealed by a gesture drag on the display 608 using one or more fingers. In addition, the tray area 640*a* may be displayed in response to a predetermined state of the device 100. Revealing the application tray area 640*a* may be visually represented in a number of ways. Moreover, the effect that revealing the tray may have on displayed applications may also be represented in a number of ways. In some embodiments, the application tray area 640*a* may fly-out from a side of the device 100. In other embodiments the application tray area 640*a* may appear from a location of the display 608. The manner in which the tray area 640*a* transitions can be configured with regard to speed, color, transparency, audio output, and combinations thereof. In another embodiment, the application tray area 640*a* may be "pulled" in a direction 634 from a side of the device 100 to appear over displayed applications. In yet another embodiment, the application tray area 640*a* may be pulled from a side of the device 100 to share the display 608 with any displayed applications. This embodiment may require the resizing of displayed applications to provide adequate display area for the revealed tray area 640a. In one embodiment, as the tray area 640a increases in size, the displayed applications may decrease in size, and vice versa.

The tray area 640a may contain various items including but not limited to folders, menu structures, pictures, and/or other icons representative of one or more configurable dash display applications. The items displayed in the tray area 640a may reside in at least one local memory and/or reside in at least one remote memory location (e.g., the cloud). It is an aspect of the present disclosure that applications may be accessed, purchased, and/or sampled from at least one application store 560 via the app store icon 648. The App store icon 648 may reside in the tray area 640a. Once at least one application is chosen, purchased, and/or downloaded, it may be accessible from any number of folders 636a, 636b, 636c, . . . , 636n and/or as an icon displayed to the GUI. Navigation through various menu structures and/or access to additional features may be made via one or more menu function icons 644.

The tray area 640a and/or the configuration area 640b of the GUI may include one or more user-activated buttons, including but not limited to, a preferences icon 652, Heads-Up Display ("HUD") icon 656, and a save icon 660. In some embodiments, the preferences icon 652 may be used to alter the manner in which content is presented to the device display 608. The HUD icon 656 may be used to change the configuration display screen 680 and/or display the configured dash display onto a HUD. The HUD may employ various methods and light sources to display the configurable dash display to one or more users, including but not limited to, projection, Cathode Ray Tube ("CRT"), Light Emitting Diode ("LED"), Liquid Crystal Display ("LCD"), Organic Light Emitting Diode ("OLED"), and the like. The save icon 660 may be used to save one or more of the configured dash displays. Each configuration may be associated with one or more users. The HUD configuration may be saved via the save icon 660. In some embodiments, the functions associated with the user-activated buttons may be accessed automatically and/or in response to at least one signal sent by a processor.

The configuration area 640b of the GUI may contain various items including but not limited to folders, menu structures, pictures, and/or other icons representative of one or more configurable dash display applications. For example, the configuration area 640b may show a configuration display screen 680. This configuration display screen 660 represents the arranged GUI of the display device which may be configured in this area of the device screen 608. It is one aspect of the present disclosure that applications from the tray area 640a may be dragged and dropped into place on the configuration area 640b of the device screen 608. Once inside the configuration area 640b each application may be adjusted according to desired user specifications. Various configurations represented by the configuration display screen 680 may be saved by initiating a save function through a save icon 660.

FIG. 6B depicts a second representation of a graphical user interface of a configurable dash display in accordance with one embodiment of the present disclosure. In particular, a user 664 is accessing an application from a menu structure 636a in the tray area 640a. The user may select one or more applications from any menu structure, or combination of menu structures, and drag the application around the GUI in any direction 668. For example a user may wish to select a new gauge from the meters folder 636a and drag it to the configuration area 640b for deployment in the configuration display screen 680 and even be displayed in the configurable dash display GUI.

Referring now to FIG. 6C a fourth representation of a graphical user interface of a configurable dash display in accordance with one embodiment of the present disclosure is shown. As shown, a user 664 has dragged a meter application 618 in a direction 672 that crosses the tray area 640a and configuration area 640b separator, the tray handle 632. The meter application may have been chosen from a folder 636a in the tray area 640a to be dropped in the configuration display screen 680 of the configuration area 640b. It is an aspect of the present disclosure that one or more applications may be dragged between the tray area 640a and the configuration area 640b, and vice versa. The applications may be dragged from one area to be dropped in another and/or dragged and dropped within the same area. The behavior of a dropped application may change if the area from which it was dragged differs from the area to which it is dropped. For instance, an application may be dragged from the tray area 640a to be dropped in the configuration area 640b. In this case, the application behavior on this type of drag may be configured to add the application to the configuration area and/or the configuration display screen 680. In contrast, the same application may be dragged from the configuration area 640b to be dropped in the tray area 640a. In this scenario, the behavior of the application may be configured to delete the application from the configuration area 640b once it is "dropped" in the tray area 640a. In this scenario, it is not necessary that the application be added to the tray area 640a. This application behavior may be configured to be interchangeable between areas and/or configured to be similar between areas.

Figure 7:
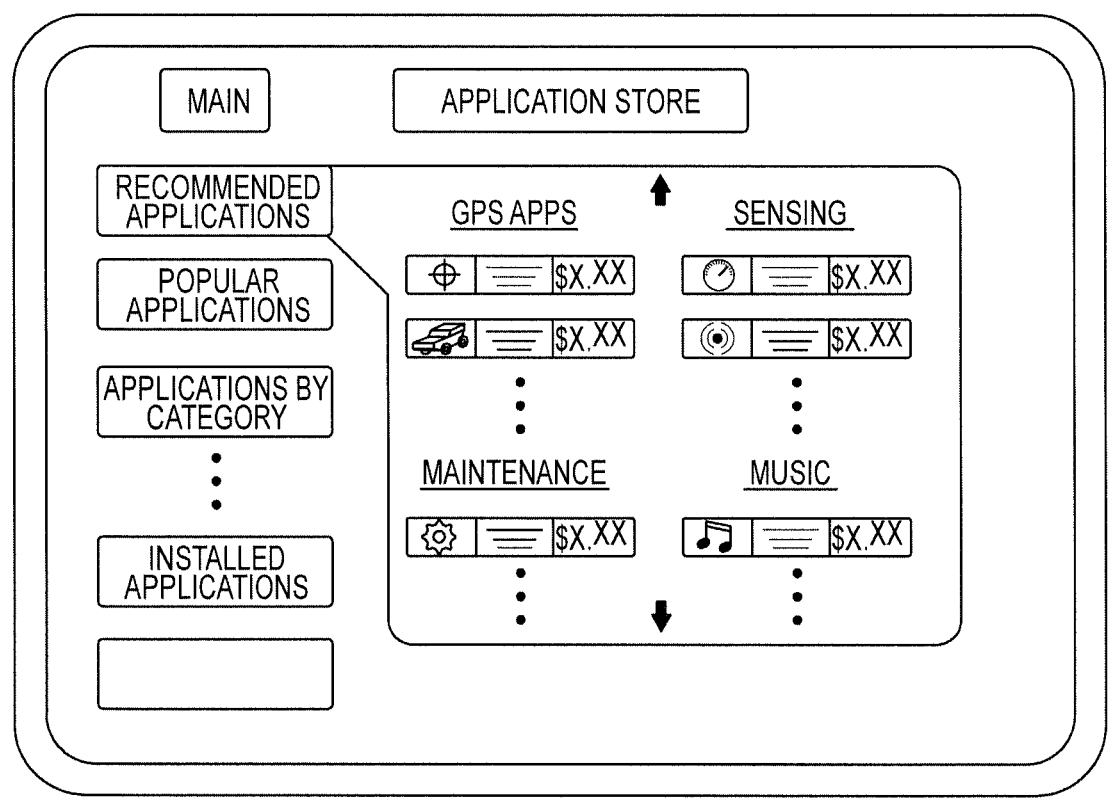
FIG. 7 depicts a representation of an application store in the configurable graphical user interface according to an embodiment.

FIG. 7 depicts another example of an application store display window opened by a user. The window 700 includes the application store icon 704 (which has been selected by the user) and a main icon 708 (to return to an earlier window in the menu). The drop down window resulting from selection of the application store icon 704 includes recommended applications 712 (which are depicted as GPS applications 732, vehicle maintenance applications 740, sensing applications (which provide to a user real time or near real time sensed information) 736, and music (e.g., media player) applications 744), popular applications 716, applications by category 720, installed applications 724, and search 728.

The recommended applications icon 712, when selected, provides recommendations and/or relative application rankings based on user preferences, a user profile (including for example likes and dislikes, socioeconomic information, hobbies, and the like), user input, user or operator behavior (e.g., driving patterns, application selection/purchase/downloading history, and the like), sensed information regarding vehicle state, configuration, on board hardware and software resources and/or modules and/or algorithms and/or components and settings and properties thereof (e.g., microprocessor(s), central processing units (e.g., SPECint, SPECfp benchmarks, instructions per second or cycle, floating point operations per second ("FLOPS"), performance per watt, interrupt latency, and Giga-updates per second), network performance (e.g., service quality measures such as bandwidth, throughput, latency, jitter, and error rate), available, unused, unavailable, and/or in use memory capacity, operating system, vehicle local network algorithms and messaging and signaling protocols, on board satellite location and/or positioning systems (such as GPS), etc.), operation, occupant(s), location, observed user behavior (e.g., observed application preferences of the current and/or other users of vehicles in previous transactions), type, make, model, and/or year of manufacture of the vehicle, currently docked communication devices of the user and the device's content, features, components, and capabilities, vehicle manufacturer requirements or restrictions (e.g., maintaining manufacturer control over applications can be important to maintaining vehicle safety levels), and/or other factors, and behavior and/or application preferences of non-occupants or third party users (particularly drivers of other vehicles located proximately or within a selected geographic region). The applications selected as recommended applications can vary in response to changes in any of the above information. Typically, each application is assigned a preference value based on or more of the above types of information, which value is updated periodically. The preference values of the applications are compared, with the higher (or lower depending on configuration) valued applications being treated as "recommended" or "not recommended". Only the recommended applications are displayed when the icon 712 is selected.

By way of example, application recommendations may be based on sensed information when the vehicle is in operation. For instance, a vehicle maintenance or repair application may be pushed to or pulled by the display device 100 when sensed information and/or the vehicle control system indicates a potential mechanical or other operational issue or trigger for routine maintenance to occur. In another instance, a map or location-based service may be pushed to or pulled by the display device 100 in response to a current sensed location of the vehicle.

By way of further example, one or more recommended, possible, and/or available application listing(s) (such a listing being referred to as "vehicle compatible applications") may be based on one or more of vehicle state, configuration, on board hardware and/or software resources and/or modules and/or algorithms and/or components and/or settings and/or properties thereof. By contrast, "vehicle unavailable applications" refers to an application listing incompatible applications based on one or more of current vehicle state, configuration, on board hardware and/or software resources and/or modules and/or algorithms and/or components and/or settings and/or properties thereof. For instance, local memory 308 and/or data storage 312 can include current configuration information on the vehicle configuration, on board hardware and software resources and/or modules and/or algorithms and/or components and/or settings and/or properties thereof. The configuration data structures can include hardware and software resources, settings, and/or components and/or properties thereof of occupant portable personal computational devices, such as tablet computers, smart phones, laptops, etc. Whenever an on board hardware and software resource and/or component and/or setting and/or property thereof and/or occupant portable personal computational device hardware and software resource and/or component and/or setting and/or property thereof is/are added, removed, updated, modified, or changed, the configuration data structures are updated to be current. Additions, removals, updates, modifications, or changes can be detected by known techniques, such as receipt of a unique identifier (e.g., serial number), version or release number, and other licensing and/or authentication and/or verification and/or other installation or update information from an installed or updated component. In response to changes in the configuration data structures, the application manager 462 can update dynamically the vehicle compatible applications in the application store 460. The application manager 462 can also provide "what if" application listings showing what vehicle compatible applications are available if a specified on board or network accessible hardware and/or software resource and/or component and/or setting and/or property thereof is added, installed, updated, and/or otherwise made available to the vehicle computational system. The application manager 462 can prompt an occupant for consent to change and/or arrange purchase, licensing, installation, and/or other acquisition of the needed on board or network accessible hardware and/or software resource and/or component and/or setting and/or property thereof and, at the occupant's request, proceed automatically with the change and/or arrange purchase, licensing, installation, and/or other acquisition of the needed on board or network accessible hardware and/or software resource and/or component and/or setting and/or property thereof.

The popular applications icon 716, when selected, provides those applications that are most popular (with respect to purchase, free download, or both) over a selected time period among a selected set of users. The selected set of users may depend on a current location of a user and be based on a geopolitical relationship of the current user location. For instance, the selected set of users may, relative to a current location of the user, be global, country wide, statewide, county wide, city wide, and the like. For example, an application to access a local news, weather or radio station may be limited to users within a certain distance of the station's signal broadcast antenna. Alternatively or additionally, the selected set of users may be users of the same type, make, model, and/or year of manufacture of the vehicle 100. For example, an application, such as a vehicle maintenance application, may be limited, in usefulness, to users of Toyota Camrys.

The applications by category icon 720, when selected, provide applications by category. Categories include, for example, automotive maintenance or repair, automotive monitoring, location-based services (e.g., navigation), entertainment (e.g., media), games, health and fitness, lifestyle, travel, medical, news, weather, productivity, reference, maps, social networking, utilities, and the like.

The application memberships of each of the recommended and popular applications 712 and 716 can vary user-by-user. In other words, a first vehicle operator can have a first (application) membership for one of recommended and popular applications 712 and 716 and a second different vehicle operator can have a second different (application) membership of the one of recommended and popular applications 712 and 716. This stems from the differing results obtainable based on the factors applied in determining (application) membership.

The installed applications icon 724, when selected, provides a listing of applications currently installed on the display device 100 for editing. Editing includes deletion or removal and deactivation (when currently executing).

The search icon 728, when selected, provides a search capability to search an application store library for applications satisfying user specified search terms and/or phrases.

Figure 8:
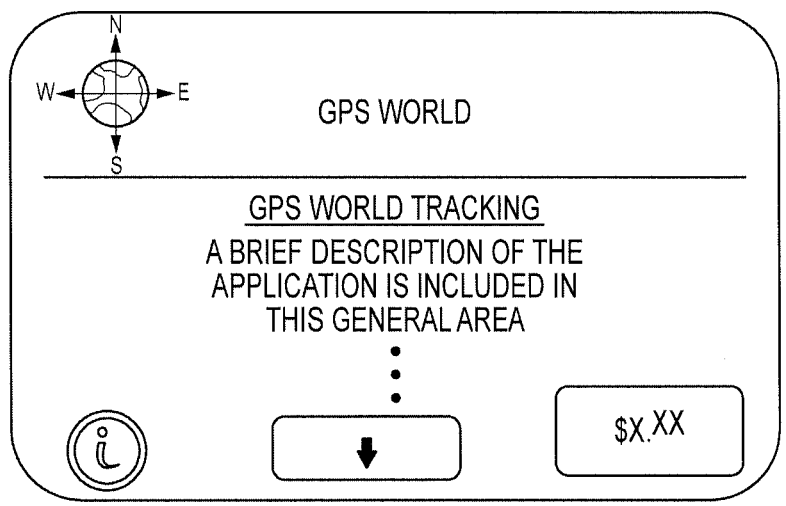
FIG. 8 depicts a representation of an application store in the configurable graphical user interface according to an embodiment.

FIG. 8 depicts a display window that appears when an application icon in the application store is selected. The window 800 includes a name of the application 804, a high level description of the application 804, an information icon 808 for more detailed information about the application, a down cursor 812 to scroll down through the application description, and a price icon 816 to provide a charge required to download the application corresponding to the selected application icon.

Figure 9A:
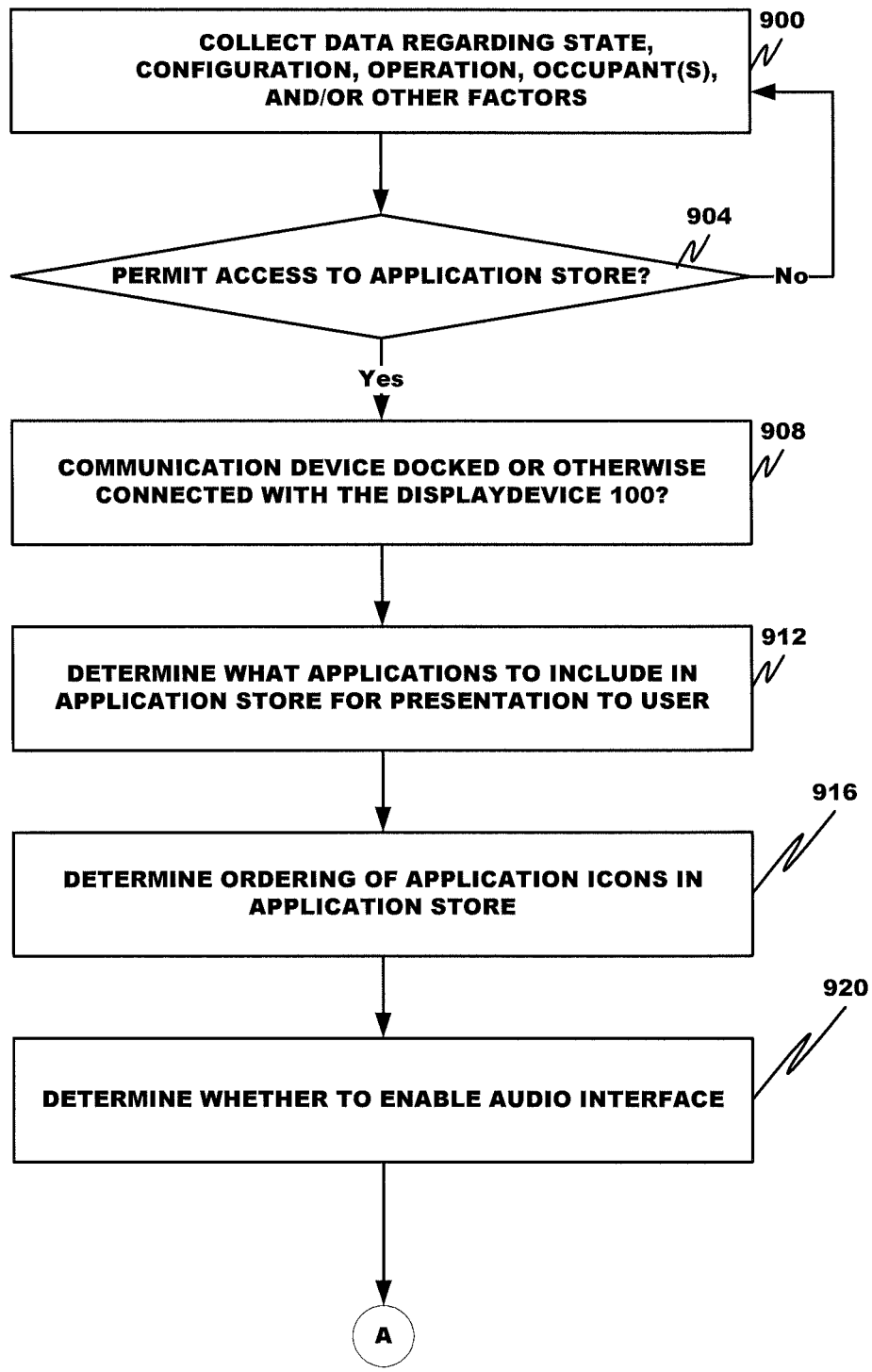
FIGS. 9A, 9B, and 9C are flow diagrams depicting a method according to an embodiment.

The operation of the application manager 462 and application store 460 will now be discussed with reference to FIGS. 9A and 9B.

In step 900, the application manager 462 collects data regarding a current vehicle state, configuration, operation, occupant(s), and other sensed information (received from one or more of the sensors referenced herein), user preferences, user profile, user input, user behavior, location, type, make, model, and/or year of manufacture of the vehicle and/or other factors, and behavior and/or application preferences of non-occupants or third party users (particularly drivers of other vehicles located proximately or within a selected geographic region of a current satellite-based location of the vehicle 200).

In decision diamond 904, the application manager 462 determines whether to permit or enable access to the application store. This determination may be in response to user preferences, vehicle manufacturer policies or rules, federal, state, or local law, and the like. Such restrictions can hinder drivers and other vehicle operators from operating vehicles while interacting with the application store, thereby substantially reducing driver distraction and reducing accidents, particularly among teenage drivers.

Vehicle-device-use laws may be provided by an organization, governmental entity, group, individual, and/or combinations thereof. The laws may be stored locally or retrieved from a remotely located storage. The vehicle-in-use laws may be statutes and/or regulations that are enforced by a government entity, such as a city, municipality, county, province, state, country, and the like. These laws may define vehicle, traffic, transportation, and/or safety rules associated with a given geographical region. An exemplary vehicle-in-use law governs texting, cellular phone use, video availability to the operator when the car is in motion and the like). The laws may be updated from time to time to, among other things, account for changes in the laws. While the user/vehicle is traveling in a first geopolitical entity, the application manager may refer to the laws of the first geopolitical entity and determine to control the display device 100 in accordance with the first geopolitical entity's law. When the user/vehicle is detected as being in a second geopolitical entity, the application manager controls the display device 100 based, at least in part, on the laws of the second geopolitical entity. The on-board vehicle sensors may determine at least one location of the user/vehicle, and refer to laws associated with that at least one location to control the display device 100 accordingly.

The application manager may also recognize one or more characteristics associated with a user, the user's vehicle, and/or device and limit access to device features at least partially based on the one or more characteristics.

In one configuration, these characteristics may include, but are not limited to, location of the user and/or device, user profile settings, user preferences, registration status of the device, device settings, programmed conditions, and the like. For example, a user may be operating a device in the passenger seat of an automobile. Moreover, the user may have established a connection between the device and the vehicle (e.g., via Bluetooth, direct electrical connection, wireless, radio frequency (RF), infrared (IR), etc.). In this example, the vehicle control system may utilize one or more of the vehicle/device sensors to determine the location of the device user. Upon detecting that the user and/or device in this case is located in a passenger seat, the application manager may determine that feature access should not be controlled. On the other hand, if the user was seated in a vehicle operation seat (e.g., driver's seat) the application manager may determine to limit access to one or more features of the display device, particularly the application store.

It is anticipated that the application manager may refer to other factors when determining to allow or deny a user access to a device's features. Among these other factors are contractual rules/obligations, programmed conditions, vehicle state, emergency contingencies, and combinations thereof. For instance, a vehicle may be detected to be "in motion" by the feature control module and various vehicle/device sensors. Based on the vehicle state (i.e., in motion), the location of the user (i.e., driver's seat), and a local law (i.e., prohibiting use of devices by drivers of a moving vehicle) the application manager may determine to deny access to application store features.

In some embodiments, the application manager may itself receive from the satellite positioning system receiver in the vehicle satellite location information alone or in conjunction with vehicle-related state, configuration, and/or operation information (speed, parking sensors, etc.) to determine the current vehicle state, configuration, and/or operation. When, for example, a vehicle is in motion, the application manager can disallow/deactivate application store access. Once the vehicle is determined to be in a "parked" condition (e.g., in "Park"), or otherwise motionless, the application store may be allowed and activated.

In some embodiments, the application manager may deactivate only selected features of the application store.

In any of the above embodiments, the deactivation may be coupled with a presented warning in the form of a visual and/or audible alert on the display device.

The application manager may reactivate these deactivated features once the vehicle is in a state of rest and/or parked.

Deactivation of the application store may also be in response to contract requirements (such as employment or insurance contracts), employer rules or policies, etc.

Access to the application store may also be restricted based on unsuccessful authentication of the user.

Referring again to FIG. 9A, when access is to be denied, the application manager returns to step 900, and, when complete or partial access is to be permitted, the application manager proceeds to step 908.

In step 908, the application manager determines whether a communication device, other than an on-board communication device, is docked or otherwise connected with the display device 100. It further determines what applications are installed on the communication device that may be executed by the display device 100. In response, the user may be queried whether the application is to be executed by the display device 100 rather than or in addition to execution by the communication device. Appropriate changes may be made to license restrictions or permissions to enable the application to be installed and executed or run, temporarily or permanently, on the display device 100. As will be appreciated, the changes required to comply with license restrictions depend on the type of software license. A perpetual license allows a customer to install and use software indefinitely. A subscription license allows the user to use the software for a specified time period. A freeware license is offered as freeware by the author and does not require paying any fee for use. A shareware license is a license to use software for a trial period followed by payment of a shareware fee if further use is desired. A volume license allows a user to install the software on a certain number of computers. A site/enterprise license provides access to software at a single location. A server (network) license is licensed per server. A per seat (machine) license is licensed per machine/seat. A per processor license is licensed per processor in the server on which the software is executing.

In step 912, the application manager determines what applications to include in the application store for presentation to the user. In this step, memberships of sets of applications corresponding to recommended applications 712, popular applications 716, applications by category 720, vehicle compatible applications, and installed applications 724 are determined as set forth above. As noted, memberships can be a function of the information collected in steps 900 and 908.

In one configuration, the applications presentable and/or selectable to the user of the vehicle are restricted by the vehicle manufacturer. This can be done by enforcing vehicle manufacturer white lists and/or black lists of applications. Alternatively or additionally, this can be done by requiring compliance with predetermined requirements or restrictions. Maintaining manufacturer control over applications can be important to maintaining vehicle brand goodwill and safety levels.

In step 916, the application manager determines an ordering of application icons in the application store. Generally, the ordering is based on a determined desirability of each application to the user and/or one or more other factors referenced above. For example, the application manager determines for each of the application store application sets or classes, namely recommended applications 712, popular applications 716, applications by category 720, vehicle compatible applications, vehicle incompatible applications (e.g., the applications not included in the set or class of vehicle compatible applications such as "what if" applications), and installed applications 724, and an ordering or ranking of the applications presented to the user. In one configuration, the applications in each of recommended, popular, vehicle compatible applications, vehicle incompatible applications, and/or applications by category applications 712, 716, and 720 are determined based on a selected set of metrics or factors and/or ranking algorithms, which may be the same or different when compared to one another. The set of metrics or parameters and/or ranking algorithms for the recommended applications 712 can thus differ from the set of metrics or parameters applied for each of popular, vehicle compatible applications, vehicle incompatible applications, and applications by category applications 716 and 720 and vice versa. The relative rankings of the applications in the recommended, popular, vehicle compatible applications, vehicle incompatible applications, and/or applications by category applications 712, 716, and 720 are commonly based on a relative score or rating value determined by the ranking algorithm. By way of illustration, a first application relates to maintenance or repair of the vehicle and a second application to location-based services. When a user is on a long trip, such as application manager determined by miles driven as a function of time, and sensed information is within normal value ranges, the location-based services is assigned a higher ranking than the maintenance or repair application. When the user is not on a long trip or when sensed information is outside normal value ranges and a possible vehicle component malfunction is detected, the maintenance or repair application is assigned a higher ranking than the maintenance or repair application.

In step 920, the application manager determines whether or not to enable an audio interface to enable user interaction with the application store. This interface can be initiated as a result of a user preference, a state, configuration, or operation of the vehicle, and the like. In one configuration, the audio interface provides, by audio output and for a selected menu selection, each application option to the user and the user, through spoken command, accesses the various options and operations of the application store. For safety reasons, the application manager can disable the video (application store) output or window(s) and enable the audio output, such as when the vehicle is in motion.

Figure 9B:
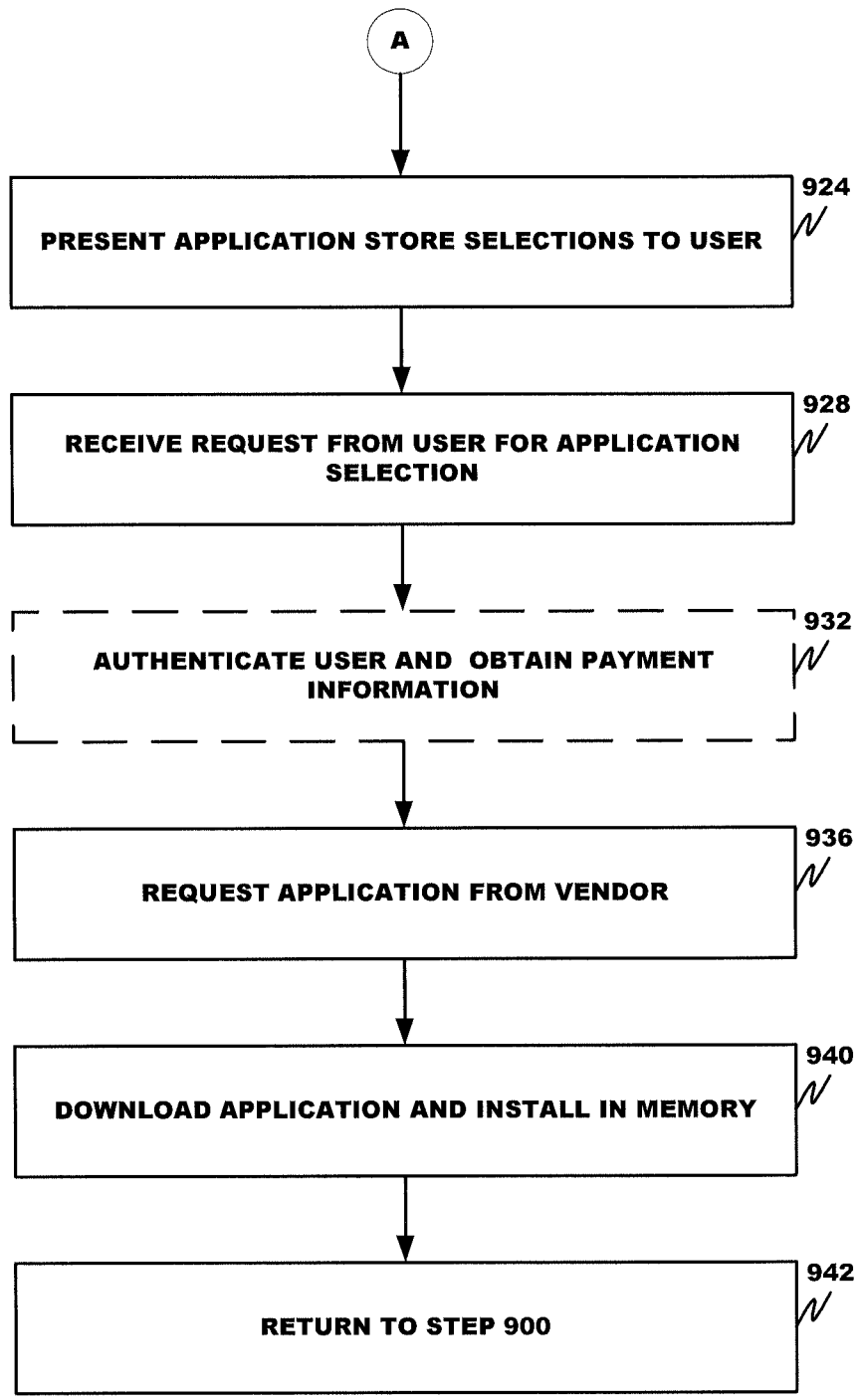

Referring now to FIG. 9B, the application manager, in step 924, presents the application store selections/options to the user as discussed above.

In step 928, the application manager receives a request from the user for an application selection.

In optional step 932, the application manager authenticates the user and, if necessary, obtains payment information for the selected application.

In step 936, the application manager, when the application is not stored locally, requests the application to be uploaded onto a wide area network, such as the Internet, and transmitted to the application manager for downloading into local memory.

In step 940, the application manager downloads the selected application from the wide area network and installs the application in memory.

In step 942, the application manager returns to step 900.

Figure 9C:
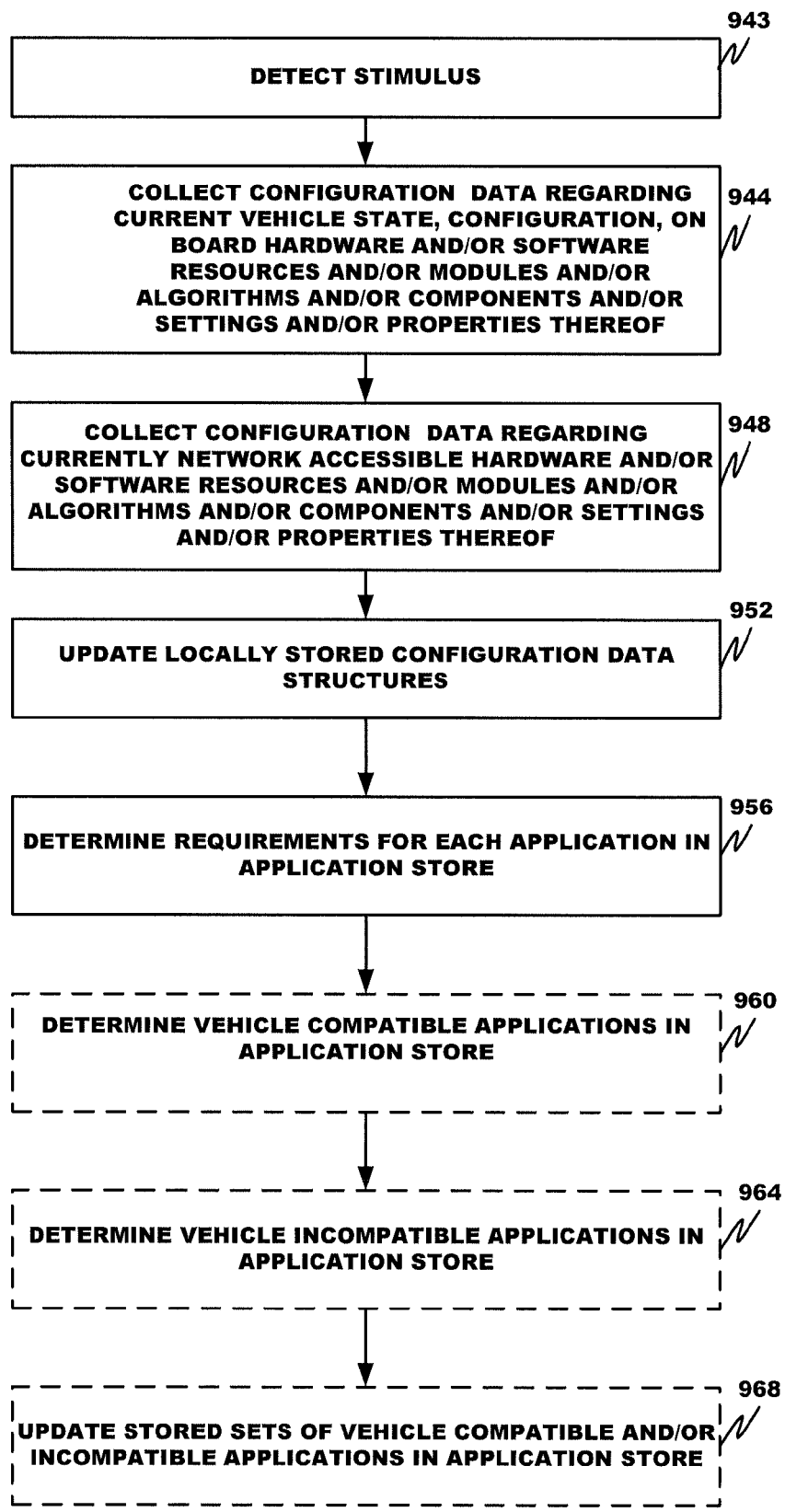

Referring now to FIG. 9C, the process by which the application manager updates and maintains the vehicle configuration data structures is depicted.

In step 943, the application manager detects a stimulus to initiate execution of the process. The stimulus can be, for example, an occupant request for a set of vehicle compatible and/or incompatible applications in the application store, receipt of a signal or message indicating the addition, installation, update, and/or network accessibility (such as a connection request by a portable personal communication device) of an on board or network accessible hardware and/or software resource and/or component and/or setting and/or property thereof.

In step 944, the application manager collects current configuration data regarding the current vehicle state, configuration, on board hardware and/or software resources and/or modules and/or algorithms and/or components and/or settings and/or properties thereof. This can be done by polling on board computational components for configuration information, obtaining configuration information from a managed information base of the computational component, and other techniques known to one of ordinary skill in the art.

In step 948, the application manager collects current configuration data regarding the currently network accessible hardware and/or software resources and/or modules and/or algorithms and/or components and/or settings and/or properties thereof. This can be done by known techniques, including any of the techniques described in step 944. As will be appreciated, security measures implemented by a customer computational device can prohibit access to its configuration data. Such devices generally would not be considered to be network accessible and would be tagged appropriately in the local memory 308 and/or data storage 312. The electronic address, device type, and other information required for network access of each customer portable computational device and the on board vehicle hardware and/or software resources and/or modules and/or algorithms and/or components can be maintained in a network topology stored in the local memory 308 and/or data storage 312. Each device or module in the network topology can be linked to an appropriate set of configuration data.

In step 952, the application manager updates the locally stored configuration data structures to reflect the collected information respecting on board and/or network accessible hardware and/or software resource and/or component and/or setting and/or property thereof.

In step 956, the application manager determines hardware (e.g., microprocessor(s), central processing units (e.g., SPECint, SPECfp benchmarks, instructions per second or cycle, floating point operations per second ("FLOPS"), performance per watt, interrupt latency, and Giga-updates per second), network performance (e.g., serviced quality measures such as bandwidth, throughput, latency, jitter, and error rate), available, unused, unavailable, and/or in use memory capacity, operating system, vehicle local network algorithms and messaging and signaling protocols, and other required components and settings and properties thereof) and software (e.g., operating system) requirements for each application currently available in the application store.

In optional step 960, the application manager determines the set of vehicle compatible applications by mapping the hardware and software requirements for each available application in the application store against those on board and/or network accessible hardware and/or software resources and/or modules and/or algorithms and/or components and/or settings and/or properties thereof to determine which applications can be installed and/or executed currently by an on board and/or network accessible microprocessor.

In optional step 964, the application manager determines the set of vehicle incompatible applications by mapping the hardware and software requirements for each available application in the application store against those on board and/or network accessible hardware and/or software resources and/or modules and/or algorithms and/or components and/or settings and/or properties thereof to determine which applications cannot be installed and/or executed currently by an on board and/or network accessible microprocessor and, for incompatible applications, a currently lacking requirement to install and/or execute the incompatible application. This lacking requirement can be recorded as a reason code with each requirement having a substantially unique reason code.

In optional step 968, the application manager updates the stored sets of vehicle compatible and/or incompatible applications.

The exemplary systems and methods of this disclosure have been described in relation to vehicle processing systems. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a vehicle computer system, a Personal Computer (PC), laptop, netbook, smart phone, Personal Digital Assistant (PDA), tablet, etc., or collocated on a particular node of a distributed network, such as an analog and/or digital communications network, a packet-switch network, or a circuit-switched network or collocated on a particular node of a distributed network, such as an analog and/or digital communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a server. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the application store is applied in a vehicle other than a wheeled or tracked vehicle. For example, the application store can be implemented in an aircraft, boat, ship, and the like.

In another alternative embodiment, the application store can include not only media player software but also media itself. Media, for example, can involve one or more media types (e.g., audio and/or video). Media can thus refer to music, movies, videos, audio books, pictures, screen savers, display wallpaper, and the like.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a microprocessor executable application manager, vehicle configuration data, wherein the vehicle configuration data is stored locally in a tangible and non-transitory computer readable memory of a vehicle and wherein the vehicle configuration data is updated dynamically to reflect a change in the vehicle configuration data, wherein the vehicle configuration data relates to one or more of an on board hardware and/or software resource, module, algorithm, and/or component and/or a setting and/or property thereof;
   determining, by the application manager, a requirement of a selected application in an application store, wherein the requirement relates to one or more of a microprocessor, central processing unit, a service quality measure of network performance, available, unused, unavailable, and/or in use memory capacity, and operating system, the application store comprising information relating to a plurality of applications available for installation on a vehicle computer, the plurality of applications comprising a plurality of an application related to at least one of a handicap and accessibility graphical user interfaces, an email client, a web browser, a communications application, a game, an entertainment application, a satellite positioning system receiver application, an automotive navigation application or a device, a map application, a medical information application, an emergency service application, a noise suppression application, a news-related application, a vehicle manual related application, a weather information-related application, a biometric application, a travel application, a speech recognition application, an application to read to an operator of the vehicle Really Simple Syndication ("RSS") feeds, Twitter messages, email messages, and/or instant messages, a social networking application, a streaming media application, and a utility application; and
   comparing, by the application manager, the vehicle configuration data with the requirement of the selected application to determine at least one of whether the selected application can be installed currently in an electronic readable memory of the vehicle computer and/or whether the selected application can be executed currently by the vehicle computer.

2. The method of claim 1, further comprising:
   configuring, by the application manager and for presentation to a user, a graphical interface of the application store based the vehicle configuration data.

3. The method of claim 2, wherein the configuring comprises generating and providing to the user a vehicle compatible listing of applications in the application store.

4. The method of claim 2, wherein the configuring comprises generating and providing to the user one of a vehicle incompatible listing of applications in the application store and a set of requirements for one or more vehicle incompatible applications to be executable by the vehicle computer.

5. The method of claim 2, wherein an application store configuration is based on one or more of whether a communication device, separate from the vehicle, is docked or otherwise in signal communication with the application manager and a configuration of and/or applications stored on and executable by the communication device.

6. The method of claim 5, wherein the application manager changes license restrictions or permissions to enable one or more of the applications stored on the communication device to execute on a processor on-board the vehicle.

7. The method of claim 1, wherein the vehicle configuration data relates to one or more of a current vehicle state, configuration, on board hardware and/or software resource, module, algorithm, and/or component and/or a setting and/or property thereof, and wherein the requirement relates to one or more of hardware, vehicle local network performance, memory, operating system, software, and vehicle local network algorithm and/or messaging and/or signaling protocol.

8. The method of claim 1, wherein the vehicle configuration data relates to one or more of a currently on board vehicle network accessible hardware and/or software resource, module, algorithm, and/or component and/or a setting and/or property thereof and wherein the requirement relates to one or more of hardware, vehicle local network performance, memory, operating system, software, and vehicle local network algorithm and/or messaging and/or signaling protocol.

9. The method of claim 1, wherein the plurality of applications comprise applications directed to one or more of the following: a vehicle control application, and an application associated with at least one vehicle task, function, and operation, wherein the application store configuration is based on sensed information received from one or more vehicle sensors, and wherein the sensed information comprises one or more of the following: wheel state, vehicle speed, acceleration, deceleration, wheel rotation, wheel speed, wheel slip, power source energy output, engine speed, energy input and/or output, turbine speed, input speed, crankshaft position, manifold absolute pressure, mass flow, switch state, a transmission setting, a gear control current setting, a setting of a power controller, a state of a braking system, a seat setting, a weight and/or identity of seated occupant, exterior sound levels, interior sound levels, safety system state, light setting, brake control setting, accelerator pedal setting or angle, clutch pedal setting, emergency brake pedal setting, door setting, engine temperature, passenger compartment or cabin temperature sensor, window setting, imaging output, odometer reading, trip mileage reading, wind speed, radar transmitter/receiver output, brake wear, steering/torque, oxygen level, ambient lighting, ranging sensor output, parking sensor output, heating, venting, and air conditioning (HVAC) sensor output, water sensor output, air-fuel ratio meter output, blind spot monitor output, hall effect sensor output, radio frequency (RF) sensor output, infrared (IR) sensor output, vehicle control system sensor output, wireless network sensor output, vehicle location, vehicle direction of travel, and cellular data sensor output.

10. A tangible and non-transient computer readable medium, storing microprocessor executable instructions that, when executed, perform the following operations:
determine vehicle configuration data wherein the computer readable medium is located in a vehicle, wherein the vehicle configuration data is updated dynamically to reflect a change in the vehicle configuration data, wherein the vehicle configuration data relates to one or more of an on board hardware and/or software resource, module, algorithm, and/or component and/or a setting and/or property thereof;
determine a requirement of a selected application in an application store, and wherein the requirement relates to a microprocessor, central processing unit, a service quality measure of network performance, available, unused, unavailable, and/or in use memory capacity, and operating system, the application store comprising information relating to a plurality of applications available for installation on a vehicle computer, the plurality of applications comprising a plurality of an application related to at least one of a handicap and accessibility graphical user interfaces, an email client, a web browser, a communications application, a game, an entertainment application, a satellite positioning system receiver application, an automotive navigation application or device, a map application, a medical information application, an emergency service application, a noise suppression application, a news-related application, a vehicle manual related application, a weather information-related application, a biometric application, a travel application, a speech recognition application, an application to read to an operator of the vehicle Really Simple Syndication ("RSS") feeds, Twitter messages, email messages, and/or instant messages, a social networking application, a streaming media application, and a utility application; and
compare the vehicle configuration data with the requirement of the selected application to determine at least one of whether the selected application can be installed currently in the computer readable medium and/or whether the selected application can be executed currently by the vehicle computer.

11. The computer readable medium of claim 6, wherein the instructions, when executed, configure, for presentation to a user, a graphical interface of the application store based the vehicle configuration data.

12. The computer readable medium of claim 11, wherein the configure operation comprises generating and providing to the user a vehicle compatible listing of applications in the application store.

13. The computer readable medium of claim 11, wherein the configure operation comprises generating and providing to the user one of a vehicle incompatible listing of applications in the application store and a set of requirements for one or more vehicle incompatible applications to be executable by the vehicle computer.

14. The computer readable medium of claim 6, wherein the vehicle configuration data relates to one or more of a current vehicle state, configuration, on board hardware and/or software resource, module, algorithm, and/or component and/or a setting and/or property thereof, and wherein the requirement relates to one or more of hardware, vehicle local network performance, memory, operating system, software, and vehicle local network algorithm and/or messaging and/or signaling protocol.

15. The computer readable medium of claim 6, wherein the vehicle configuration data relates to one or more of a currently on board vehicle network accessible hardware and/or software resource, module, algorithm, and/or component and/or a setting and/or property thereof and wherein the requirement relates to one or more of hardware, vehicle local network performance, memory, operating system, software, and vehicle local network algorithm and/or messaging and/or signaling protocol.

16. The computer readable medium of claim 6, wherein the plurality of applications comprise an application directed to one or more of the following: a vehicle control application, and an application associated with at least one vehicle task, function, and operation, wherein the application store configuration is based on g2 sensed information received from one or more vehicle sensors, and wherein the sensed information comprises one or more of the following: wheel state, vehicle speed, acceleration, deceleration, wheel rotation, wheel speed, wheel slip, power source energy output, engine speed, energy input and/or output, turbine speed, input speed, crankshaft position, manifold absolute pressure, mass flow, switch state, a transmission setting, a gear control current setting, a setting of a power controller, a state of a braking system, a seat setting, a weight and/or identity of seated occupant, exterior sound levels, interior sound levels, safety system state, light setting, brake control setting, accelerator pedal setting or angle, clutch pedal setting, emergency brake pedal setting, door setting, engine temperature, passenger compartment or cabin temperature sensor, window setting, imaging output, odometer reading, trip mileage reading, wind speed, radar transmitter/receiver output, brake wear, steering/torque, oxygen level, ambient lighting, ranging sensor output, parking sensor output, heating, venting, and air conditioning (HVAC) sensor output, water sensor output, air-fuel ratio meter output, blind spot monitor output, hall effect sensor output, radio frequency (RF) sensor output, infrared (IR) sensor output, vehicle control system sensor output, wireless network sensor output, vehicle location, vehicle direction of travel, and cellular data sensor output.

17. A device, comprising:
a microprocessor;
a microprocessor executable application manager that, when executed by the microprocessor, is operable to:
determine vehicle configuration data;
determine a requirement of a selected application in an application store, the application store comprising information relating to a plurality of applications available for installation on a vehicle computer, the plurality of applications comprising a plurality of an application related to at least one of a handicap and accessibility graphical user interfaces, an email client, a web browser, a communications application, a game, an entertainment application, a satellite positioning system receiver application, an automotive navigation application or a device, a map application, a medical information application, an emergency service application, a noise suppression application, a news-related application, a vehicle manual related application, a weather information-related application, a biometric application, a travel application, a speech recognition application, an application to read to an operator of the vehicle Really Simple Syndication ("RSS") feeds, Twitter messages, email messages, and/or instant messages, a social networking application, a streaming media application, and a utility application; and
compare the vehicle configuration data with the requirement of the selected application to determine at least one of whether the selected application can be installed currently in an electronic readable memory of the vehicle computer and/or whether the selected application can be executed currently by the vehicle computer, wherein the electronic readable memory is located in the vehicle, wherein the vehicle configuration data is updated dynamically to reflect a change in the vehicle configuration data, and wherein the vehicle configuration data relates to one or more of an on board hardware and/or software resource, module, algorithm, and/or component and/or a setting and/or property thereof, and wherein the requirement relates to a microprocessor, central processing unit, a service quality measure of network performance, available, unused, unavailable, and/or in use memory capacity, and operating system.

18. The device of claim 17, wherein the application manager, when executed, configures, for presentation to a user, a graphical interface of the application store based the vehicle configuration data.

19. The device of claim 18, wherein the configure operation comprises generating and providing to the user a vehicle compatible listing of applications in the application store.

20. The device of claim 18, wherein the configure operation comprises generating and providing to the user one of a vehicle incompatible listing of applications in the application store and a set of requirements for one or more vehicle incompatible applications to be executable by the vehicle computer.

21. The device of claim 17, wherein the vehicle configuration data relates to one or more of a current vehicle state, configuration, on board hardware and/or software resource, module, algorithm, and/or component and/or a setting and/or property thereof, and wherein the requirement relates to one or more of hardware, vehicle local network performance, memory, operating system, software, and vehicle local network algorithm and/or messaging and/or signaling protocol.

22. The device of claim 17, wherein the vehicle configuration data relates to one or more of a currently on board vehicle network accessible hardware and/or software resource, module, algorithm, and/or component and/or a setting and/or property thereof and wherein the requirement relates to one or more of hardware, vehicle local network performance, memory, operating system, software, and vehicle local network algorithm and/or messaging and/or signaling protocol.

23. The device of claim 17, wherein the plurality of applications comprise an application directed to one or more of the following: a vehicle control application, and an application associated with at least one vehicle task, function, and operation, wherein the application store configuration is based on sensed information received from one or more vehicle sensors, and wherein the sensed information comprises one or more of the following: wheel state, vehicle speed, acceleration, deceleration, wheel rotation, wheel speed, wheel slip, power source energy output, engine speed, energy input and/or output, turbine speed, input speed, crankshaft position, manifold absolute pressure, mass flow, switch state, a transmission setting, a gear control current setting, a setting of a power controller, a state of a braking system, a seat setting, a weight and/or identity of seated occupant, exterior sound levels, interior sound levels, safety system state, light setting, brake control setting, accelerator pedal setting or angle, clutch pedal setting, emergency brake pedal setting, door setting, engine temperature, passenger compartment or cabin temperature sensor, window setting, imaging output, odometer reading, trip mileage reading, wind speed, radar transmitter/receiver output, brake wear, steering/torque, oxygen level, ambient lighting, ranging sensor output, parking sensor output, heating, venting, and air conditioning (HVAC) sensor output, water sensor output, air-fuel ratio meter output, blind spot monitor output, hall effect sensor output, radio frequency (RF) sensor output, infrared (IR) sensor output, vehicle control system sensor output, wireless network sensor output, vehicle location, vehicle direction of travel, and cellular data sensor output.

24. The device of claim 23, further comprising:
a passenger compartment for the vehicle operator;
a transmission;
a power source to provide power to the transmission;
a plurality of sensors to collect the sensed information; and
a vehicle control system to control vehicle operations.

25. The device of claim 17, further comprising:
a passenger compartment for the vehicle operator;
a transmission;
a power source to provide power to the transmission;
a plurality of sensors to collect the sensed information;
a vehicle control system to control vehicle operations; and a touch sensitive display adapted to access one or more selected applications, wherein an icon associated with each of plural installed applications can be moved and/or sized by a user to a desired location on the touch sensitive display to provide a user customized display configuration.

26. The device of claim 17, further comprising:
a passenger compartment for the vehicle operator;
a transmission;
a power source to provide power to the transmission;
a plurality of sensors to collect the sensed information;
a vehicle control system to control vehicle operations; and
a touch sensitive display adapted to access one or more selected applications, wherein the display comprises a console application tray, the console application tray to provide access to applications in the application store, an icon associated with plural of the applications in the application store being accessible in a first state of the console application tray and not accessible in a second state of the console application.

27. The device of claim 17, further comprising:
a passenger compartment for the vehicle operator;
a transmission;
a power source to provide power to the transmission;
a plurality of sensors to collect the sensed information;
a vehicle control system to control vehicle operations; and
a touch sensitive display adapted to access one or more selected applications, wherein an icon associated with each of plural applications, wherein an appearance of each icon indicates whether the corresponding application has been installed and/or purchased or is available for purchase via the application store.

28. The device of claim 17, further comprising:
a passenger compartment for the vehicle operator;
a transmission;
a power source to provide power to the transmission;
a plurality of sensors to collect the sensed information;
a vehicle control system to control vehicle operations; and
a touch sensitive display adapted to access one or more selected applications, wherein the plural applications in the application store are grouped and/or ranked by one or more of recommended applications for the user, popular applications based on behavior of other users, vehicle compatible application, vehicle incompatible application, and type and/or category of application based on a function provided by the application.

29. The device of claim 17, further comprising:
a passenger compartment for the vehicle operator;
a transmission;
a power source to provide power to the transmission;
a plurality of sensors to collect the sensed information;
a vehicle control system to control vehicle operations; and
a touch sensitive display adapted to access one or more selected applications, wherein the microprocessor executable application manager collects data regarding a current vehicle state, configuration, operation, location, and/or occupant(s) and determines whether or not to permit or enable access to all or part of the application store, the determination being based on one or more of a user preference, a vehicle manufacturer policy and/or rule, and/or federal, state, and/or local law.

30. The device of claim 17, further comprising:
a passenger compartment for the vehicle operator;
a transmission;
a power source to provide power to the transmission;
a plurality of sensors to collect the sensed information; and
a vehicle control system to control vehicle operations, wherein applications on a black list of applications are excluded from the application store and applications on a white list of applications are included in the application store.

* * * * *

UNITED STATES PATENT AND TRADEMARK OFFICE
CERTIFICATE OF CORRECTION

PATENT NO. : 9,098,367 B2
APPLICATION NO. : 13/963728
DATED : August 4, 2015
INVENTOR(S) : Christopher P. Ricci Page 1 of 1

It is certified that error appears in the above-identified patent and that said Letters Patent is hereby corrected as shown below:

In the Claims
Claim 1, column 34, line 25, after "a plurality of" insert --:--.
Claim 10, column 36, line 1, after "a plurality of" insert --:--.
Claim 11, column 36, line 24, delete "claim 6" and insert --claim 10--.
Claim 14, column 36, line 38, delete "claim 6" and insert --claim 10--.
Claim 15, column 36, line 47, delete "claim 6" and insert --claim 10--.
Claim 16, column 36, line 56, delete "claim 6" and insert --claim 10--.
Claim 16, column 36, line 61, delete "g2".
Claim 17, column 37, line 28, after "a plurality of" insert --:--.

Signed and Sealed this
Twenty-first Day of June, 2016

Michelle K. Lee
*Director of the United States Patent and Trademark Office*